United States Patent
Sato

(10) Patent No.: US 7,555,041 B2
(45) Date of Patent: *Jun. 30, 2009

(54) CODE QUANTITY CONTROL APPARATUS, CODE QUANTITY CONTROL METHOD AND PICTURE INFORMATION TRANSFORMATION METHOD

(75) Inventor: Kazushi Sato, Kanagawa (JP)

(73) Assignee: Sony Corporation (JP)

( * ) Notice: Subject to any disclaimer, the term of this patent is extended or adjusted under 35 U.S.C. 154(b) by 404 days.

This patent is subject to a terminal disclaimer.

(21) Appl. No.: 11/159,141

(22) Filed: Jun. 23, 2005

(65) Prior Publication Data

US 2005/0276325 A1  Dec. 15, 2005

Related U.S. Application Data

(62) Division of application No. 10/035,240, filed on Jan. 4, 2002, now Pat. No. 7,075,984.

(30) Foreign Application Priority Data

Jan. 9, 2001 (JP) ............................ P2001-001803

(51) Int. Cl.
H04N 7/12 (2006.01)
H04N 11/02 (2006.01)

(52) U.S. Cl. .............................. 375/240.05; 375/240.26

(58) Field of Classification Search ........ 375/240.01–6, 375/240.12–16, 240.26
See application file for complete search history.

(56) References Cited

U.S. PATENT DOCUMENTS

| 6,215,824 | B1 * | 4/2001 | Assuncao | ............. 375/240.26 |
| 6,404,814 | B1 * | 6/2002 | Apostolopoulos et al. | ............. 375/240.12 |
| 6,526,099 | B1 * | 2/2003 | Christopoulos et al. | 375/240.26 |
| 6,748,020 | B1 * | 6/2004 | Eifrig et al. | ............. 375/240.26 |

OTHER PUBLICATIONS

MPEG "Test Model 5", ISO.IEC JTC1/SC29/WG11/N0400, Version 2, Apr. 1993.
"Mathematical Analysis of MPEG Compression Capability and Its Application To Rate Control", Jiro Katto, et al., IE95-10, DSP95-10, Apr. 1995.
"A Fast Computational Algorithm for the Discrete Cosine Transform," Chen, et al., IEEE Trans. Commun., vol. 2.5, No. 9, pp. 1004 to 1009, 1977.
"Fast Algorithms for the Discrete W Transform and for the Discrete Fourier Transform," Wang, IEEE Tr. ASSP-32, No. 4, pp. 803-816, Aug. 1984.

* cited by examiner

Primary Examiner—David Czekaj
(74) Attorney, Agent, or Firm—Rader Fishman & Grauer PLLC; Ronald P. Kananen

(57) ABSTRACT

Code quantity control based on a virtual buffer is executed by using information extracted from picture compressed information conforming to a predetermined system. Thus, a reference quantization scale can be held at a fixed value throughout a frame. As a result, it is possible to generate picture compressed information having a smaller code quantity.

6 Claims, 11 Drawing Sheets

FIG. 2A
```
 0  1  5  6 14 15 27 28
 2  4  7 13 16 26 29 42
 3  8 12 17 25 30 41 43
 9 11 18 24 31 40 44 53
10 19 23 32 39 45 52 54
20 22 33 38 46 51 55 60
21 34 37 47 50 56 59 61
35 36 48 49 57 58 62 63
```
FIG. 2B
```
 0  4  6 20 22 36 38 52
 1  5  7 21 23 37 39 53
 2  8 19 24 34 40 50 54
 3  9 18 25 35 41 51 55
10 19 26 30 42 46 56 60
11 16 27 31 43 47 57 61
12 15 28 32 44 48 58 62
13 14 29 33 45 49 59 63
```
FIG. 3A
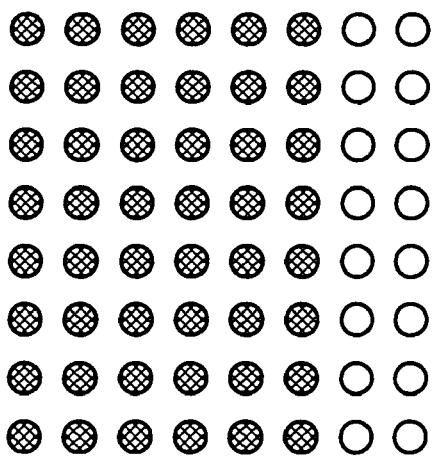
FIG. 3B
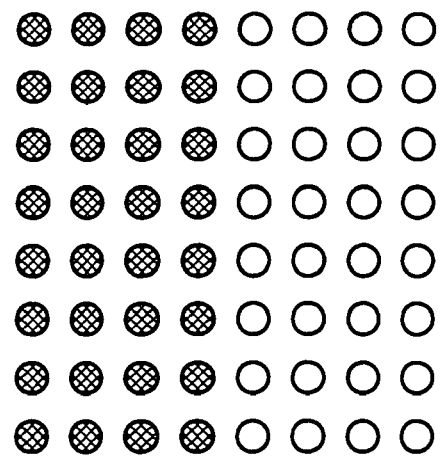

FIG. 4A
FIG. 4B
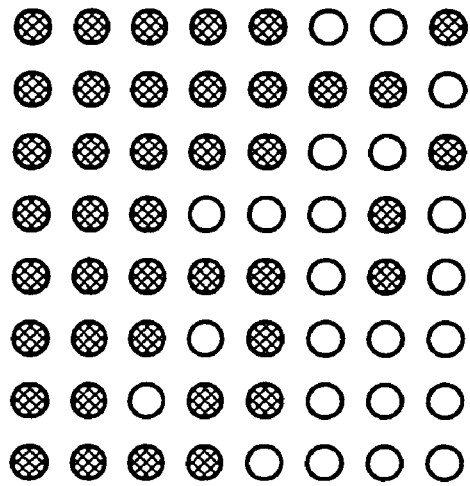
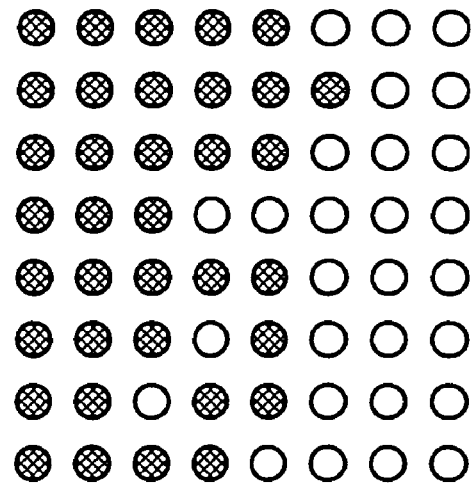
FIG. 5
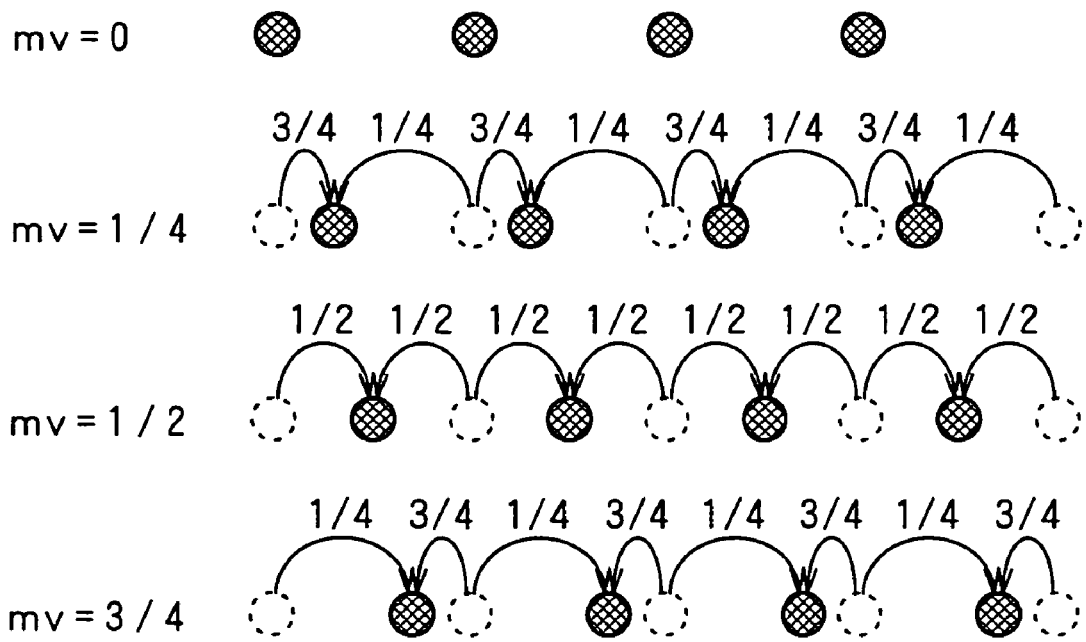

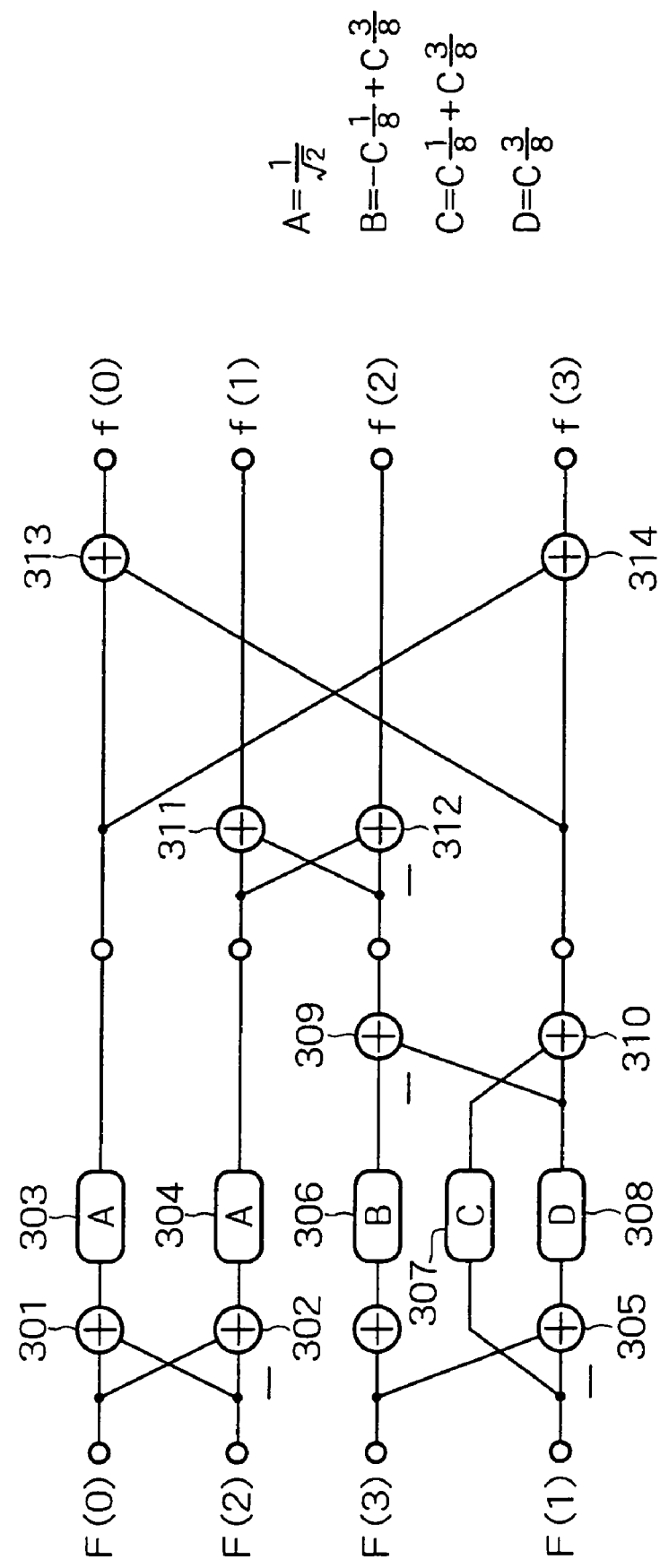

FIG. 7A $$[iD_{4\_ave}] = \begin{bmatrix} 0 & 0 & 0 & -\frac{1}{2} & 0 & 0 & 0 & 0 \\ 0 & 0 & 0 & -\frac{1}{2} & 0 & 0 & 0 & 0 \\ 0 & 0 & -\frac{1}{2} & 0 & 0 & 0 & 0 & 0 \\ 0 & 0 & -\frac{1}{2} & 0 & 0 & 0 & 0 & 0 \\ 0 & -\frac{1}{2} & 0 & 0 & 0 & 0 & 0 & 0 \\ 0 & -\frac{1}{2} & 0 & 0 & 0 & 0 & 0 & 0 \\ -\frac{1}{2} & 0 & 0 & 0 & 0 & 0 & 0 & 0 \\ -\frac{1}{2} & 0 & 0 & 0 & 0 & 0 & 0 & 0 \end{bmatrix} [iD_8] \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 1 & 0 & 0 & 0 & 0 \\ 0 & 0 & 1 & 0 & 0 & 0 & 0 & 0 \\ 0 & 1 & 0 & 0 & 0 & 0 & 0 & 0 \\ 1 & 0 & 0 & 0 & 0 & 0 & 0 & 0 \end{bmatrix}$$

FIG. 7B $$[iD_{4\_deci}] = \begin{bmatrix} 0 & 0 & 0 & 0 & 0 & 0 & 0 & 0 \\ 0 & 0 & 0 & 1 & 0 & 0 & 0 & 0 \\ 0 & 0 & 0 & 0 & 0 & 0 & 0 & 0 \\ 0 & 0 & 1 & 0 & 0 & 0 & 0 & 0 \\ 0 & 0 & 0 & 0 & 0 & 0 & 0 & 0 \\ 0 & 1 & 0 & 0 & 0 & 0 & 0 & 0 \\ 0 & 0 & 0 & 0 & 0 & 0 & 0 & 0 \\ 1 & 0 & 0 & 0 & 0 & 0 & 0 & 0 \end{bmatrix} [iD_8] \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 1 & 0 & 0 & 0 & 0 \\ 0 & 0 & 1 & 0 & 0 & 0 & 0 & 0 \\ 0 & 1 & 0 & 0 & 0 & 0 & 0 & 0 \\ 1 & 0 & 0 & 0 & 0 & 0 & 0 & 0 \end{bmatrix}$$

CODE QUANTITY CONTROL APPARATUS, CODE QUANTITY CONTROL METHOD AND PICTURE INFORMATION TRANSFORMATION METHOD

RELATED APPLICATION

This application is a divisional application of application Ser. No. 10/035,240, filed on Jan. 4, 2002 now U.S. Pat. No. 7,075,984 the entire content being incorporated by reference.

The present application claims foreign priority from Japanese Patent Application No. 2001-001803 filed on Jan. 9, 2001. The entirety of this application, including the specification, claims, drawings and summary, is incorporated herein by reference.

BACKGROUND OF THE INVENTION

The present invention relates to a code quantity control apparatus, a code quantity control method and so on, which are used in reception of picture information transmitted by way of a transmission means such as a satellite broadcasting system, a cable TV system or a network such as the Internet or used in the processing of picture information on a storage medium, such as an optical or magnetic disk, wherein the information has been compressed by orthogonal transformation, such as discrete cosine transformation, and by motion compensation, as is the case with information conforming to an MPEG (Moving Picture Experts Group) system. The present invention also relates to a picture information transformation method.

In recent years, picture information is handled as digital data. In this case, in order to allow the picture information to be transmitted and stored with a high degree of efficiency, there has been provided an apparatus conforming to a system such as an MPEG system for compressing the picture information by orthogonal transformation, such as discrete cosine transformation, and by motion compensation, which take the advantage of the existence of redundancy inherent in the picture information. Such an apparatus has been becoming popular as an apparatus used in both information distribution by a broadcasting station or the like and reception of information at an ordinary home.

In particular, an MPEG2 system (ISO/IEC 13818-2) is defined as a general picture encoding system. The MPEG2 system is a standard covering jump-scanned pictures, sequential-scanned pictures, standard resolution encoded pictures and high precision fine pictures. The MPEG2 system is expected to be used in the future in a broad range of applications including professional and consumer applications. In accordance with the MPEG2 compression system, a code quantity of 4 to 8 Mbps is allocated to a jump-scanned picture with a standard resolution of 720×480 pixels, and a code quantity of 18 to 22 Mbps is allocated to a jump-scanned picture with a high resolution of 1,920×1,088 pixels. Thus, it is possible to realize a high compression rate and a high picture quality.

However, the amount of picture information in high resolution pictures is very large so that, picture information is compressed by adopting an encoding compression system such as the MPEG system or the like, there is raised a problem that a code quantity of about 18 to 22 Mbps or even greater is required for a case in which the picture frame is a jump-scanned picture with a frequency of 30 Hz and a resolution of 1,920×1,080 pixels in order to obtain a sufficiently high picture quality. When transmitting picture information by way of network media, such as a satellite broadcasting system or a cable TV system, or when processing picture information on a storage medium, such as an optical disk or a magnetic disk, it is necessary to further reduce the quantity of code while reducing deterioration of the picture quality to a minimum. The quantity of code is reduced in accordance with the bandwidth of the transmission line of the network media or in accordance with the storage capacity of the storage medium. Such transmission and such processing are not limited to transmission and processing of a picture with a high resolution. That is to say, even in the case of transmission of a picture with a standard resolution by way of such network media and processing of the picture on such a storage medium, it is necessary to further reduce the quantity of code while reducing deterioration of the picture quality to a minimum. An example of a picture with a standard resolution is a jump-scanned picture with a frequency of 30 Hz and a resolution of 720×480 pixels.

As means for solving the problems described above, a hierarchical encoding technique (scalability technique) and a transcoding technique have been provided. In the MPEG2 standard, an SNR (Signal-to-Noise Ratio) scalability technique is standardized to allow high-SNR picture compressed information and low-SNR picture compressed information to be encoded hierarchically. In order to carry out a hierarchical encoding process, however, it is necessary to know the bandwidth or constraint conditions of a storage capacity at the time of encoding. For an actual system, however, the bandwidth or constraint conditions of a storage capacity are not known at the time of encoding in most cases. Thus, the SNR (Signal-to-Noise Ratio) scalability technique can be regarded as a means that is not appropriate for an actual system implementing an encoding process with a high degree of freedom, such as a picture information transformation method.

The configuration of a picture information transformation apparatus, which is referred to as a transcoder, basically includes a decoding unit and an encoding unit, which are connected to each other to form a parallel circuit. The decoding unit is used for carrying out a decoding process or a partial decoding process on input picture compressed information and the encoding unit is used for re-encoding data output by the decoding unit. The configuration of a transcoder can be classified into two conceivable categories. In the first category, pixel data is supplied from the decoding unit to the encoding unit through a pixel domain. In the second category, on the other hand, pixel data is supplied from the decoding unit to the encoding unit through a frequency domain. In the first category where pixel data is supplied from the decoding unit to the encoding unit through a pixel domain, the amount of processing is large. However, deterioration of a decoded picture of the compressed information can be suppressed to a minimum. The transcoder of the first category is mainly used in applications such as a broadcasting apparatus. In the second category where pixel data is supplied from the decoding unit to the encoding unit through a frequency domain, on the other hand, the picture quality deteriorates to a certain degree in comparison with the first category using a pixel domain. However, the second category can be implemented with only a small amount of processing. For this reason, the transcoder of the second category is mainly used in applications such as a consumer apparatus.

The following description explains the configuration of a picture information transformation apparatus, which transfers pixel data from the decoding unit to the encoding unit through a frequency domain, by referring to drawings.

As shown in FIG. 11, the picture information transformation apparatus 100 includes a code buffer 101, a compressed information analysis unit 102, an information buffer 103, a variable length decoding unit 104, an inverse quantization unit 105, an adder 106, a band limiting unit 107, a quantization unit 108, a code quantity control unit 109, a code buffer 110 and a variable length encoding unit 111. It should be noted that the picture information transformation apparatus 100 may also include a motion compensation error correction unit 112. In this case, however, the circuit scale becomes inevitably large even though the deterioration of the picture quality can be avoided.

The principle of operation of the picture information transformation apparatus 100 will now be explained.

Input picture compressed information having a large code quantity or a high bit rate is stored in the code buffer 101. The picture compressed information has been encoded so as to satisfy constraint conditions of a VBV (Video Buffering Verifier) prescribed by the MPEG2 standard. Neither overflow nor underflow occurs in the code buffer 101.

The picture compressed information stored in the code buffer 101 is then supplied to the compressed information analysis unit 102, which extracts information from the picture compressed information in accordance with a syntax prescribed by the MPEG2 standard. The following re-encoding process is carried out in accordance with the extracted information. In particular, information such as a quantization value (q_scale) for each macroblock and picture_coding type required in operations carried out by the code quantity control unit 109, which will be described later, is stored in the information buffer 103.

First, with regard to a direct current component of an intra macroblock, the variable length decoding unit 104 carries out a variable length decoding process on data encoded as a difference from an adjacent block and, with regard to other coefficients, the variable length decoding unit 104 carries out a variable length decoding process on data completing a run and level encoding process in order to produce quantized 1-dimensional discrete cosine transformation coefficients. Then, the variable length decoding unit 104 rearranges the quantized discrete cosine transformation coefficients obtained as a result of the decoding process into 2-dimensional data on the basis of information on a technique of scanning the picture. Typical scanning techniques include a zigzag scanning technique and an alternate scanning technique. The information on the scanning technique has been extracted by the compressed information analysis unit 102 from the input picture compressed information.

In the inverse quantization unit 105, the quantized discrete cosine transformation coefficients, which have been rearranged into 2-dimensional data as described above, are subjected to an inverse quantization process based on information on a quantization width (quantization scale) and information on a quantization matrix. These pieces of information have also been extracted by the compressed information analysis unit 102 from the input picture compressed information.

Discrete cosine transformation coefficients output by the inverse quantization unit 105 are supplied to the band limiting unit 107 for reducing the number of horizontal direction high band components for each block. 8×8 discrete cosine transformation coefficients output by the band limiting unit 107 are quantized by the quantization unit 108 at a quantization width (quantization scale) determined by the code quantity control unit 109 by adoption of a technique to be described later.

The principle of operation of the code quantity control unit 109 is explained as follows.

In accordance with a method adopted in MPEG2 Test Model 5 (ISO/IEC JTC1/SC29/WG11 N0400), the number of bits allocated to each picture in a GOP (Group of Pictures) is determined. This determination of the number of bits allocated to each picture in a GOP is referred to hereafter as stage 1. The determination of the number of bits allocated to each picture in a GOP is based on the number of bits to be allocated to unencoded pictures in the GOP. The unencoded pictures include pictures each serving as an object of bit allocation. A quantization scale is found by feedback control executed in macroblock units on the basis of the sizes of 3 types of virtual buffers set independently for each picture in order to make the number of bits allocated to each picture, which is found at stage 1, match an actual code quantity. The operation to find a quantization scale is referred to hereafter as stage 2. A quantization scale found at stage 2 is changed in accordance with an activity of each macroblock so as to result in finer quantization for the even portion in the picture, which easily allows deterioration to become visually striking, and coarser quantization for the complicated portion in the picture, which hardly allows deterioration to become visually striking. The operation to change quantization scale is referred to hereafter as stage 3. The MPEG2 picture information encoding apparatus put to practical use also executes code quantity control in accordance with an algorithm conforming to the method prescribed by Test Model 5.

If this method is adopted in the picture information transformation apparatus 100 like the one shown in FIG. 11 as it is, however, two problems will arise. The first one is a problem related to stage 1. Specifically, in the case of an MPEG2 picture information encoding apparatus, the GOP structure is given in advance so that the operation in stage 1 may be executed. In the case of the picture information transformation apparatus 100, on the other hand, the GOP structure is not known till a syntax analysis is carried out on the entire information of 1 GOP of the input picture compressed information. In addition, the length of a GOP is not necessarily fixed. In the case of an MPEG2 picture information encoding apparatus for practical use, a scene change may be detected and the length of a GOP is controlled in an adaptive manner in the picture compressed information.

The second problem is related to stage 3. Specifically, in the case of an MPEG2 picture information encoding apparatus, an activity is computed from luminance signal pixel values of the original picture. In the case of the picture information transformation apparatus 100, however, compressed information of an MPEG2 picture is input. Thus, since it is impossible to know luminance signal pixel values of the original picture, an activity cannot be calculated.

As a method to solve the first problem, a pseudo GOP is defined, and code quantity control is executed on the basis of the defined pseudo GOP. What is called a pseudo GOP includes I, P and B pictures. An I picture is a picture encoded in an encoding process based on information in 1 frame. A P picture is a picture encoded by forward directional prediction based on a plurality of previously encoded frames. A B picture is a picture encoded by bi-directional prediction based on previously encoded frames as well as frames to be encoded at later times. The length of a pseudo GOP varies in dependence on how a frame of picture compressed information is detected as an I picture.

Assume that a structure of the pseudo GOP determined as described above is $\{B_1, B_2, P_1, B_3, B_4, I_1, B_5, B_6, ---, P_L, B_{M-1} \text{ and } B_M\}$. In this case, the size L_pgop of the pseudo GOP is expressed by the following equation:

$$L\_pgop = 1 + L + M \quad (1)$$

For the pseudo GOP, target code quantities $T_i$, $T_p$ and $T_b$ of the I, P and B pictures are expressed by Eqs. (2), (3) and (4) respectively.

$$T_i = \frac{K_p K_b X(I)}{K_p K_b X(I) + K_b \sum_{i \in \Omega} X(P_i) + K_p \sum_{i \in \Omega} X(B_i)} \times R \quad (2)$$

$$T_p = \frac{K_b X(P)}{K_p K_b X(I) + K_b \sum_{i \in \Omega} X(P_i) + K_p \sum_{i \in \Omega} X(B_i)} \times R \quad (3)$$

$$T_b = \frac{K_p X(B)}{K_p K_b X(I) + K_b \sum_{i \in \Omega} X(P_i) + K_p \sum_{i \in \Omega} X(B_i)} \times R \quad (4)$$

where notations and denote an already encoded frame in the pseudo GOP and the frame in the pseudo GOP to be encoded respectively. Let notations F and B denote a frame rate and the code quantity of output picture compressed information respectively. In this case, Eqs. (5) and (6) are obtained as follows.

$$R_0 = \frac{B}{F} \times L\_pgop \quad (5)$$

$$R = R_0 - \sum_{x \in \Theta} \text{generated\_bit}(x) \quad (6)$$

Notation X (.) denotes a global complexity measure parameter representing the complexity of a frame. Let notations Q and S denote respectively the average quantization scale and the total code quantity of the frame, which are found in advance during a pre-parsing process carried out by the compressed information analysis unit 102 shown in FIG. 11. In this case, this global complexity measure parameter can be expressed by Eq. (7) as follows.

$$X = S \cdot Q \quad (7)$$

As prescribed by MPEG2 Test Model 5, notations $K_p$ and $K_b$ denote a ratio of the quantization scale of the P picture to the quantization scale of the I picture and a ratio of the quantization scale of the B picture to the quantization scale of the I picture respectively. With the ratios having values indicated by Eq. (8), the picture quality as a whole is assumed to always be optimized.

$$K_p = 1.0; K_b = 1.4 \quad (8)$$

Instead of using the values given in Eq. (8), as a conceivable alternative, the ratios $K_p$ and $K_b$ can also be computed dynamically from the complexity of each frame of input MPEG2 picture compressed information, as is described in the reference titled "Mathematical Analysis of MPEG Compression Capability and Its Application to Rate Control", Jiro Katto and Mutsumi Ohta, (IE95-10, DSP95-10, April, 1995). To put it concretely, the values of the ratios $K_p$ and $K_b$ are also given by Eq. (9) in place of those given by Eq. (8).

$$K_p(X(I), X(P_i)) = \left(\frac{X(I)}{X(P_i)}\right)^{\frac{1}{1+m}}; K_b(X(I), X(B_i)) = \left(\frac{X(I)}{X(B_i)}\right)^{\frac{1}{1+m}} \quad (9)$$

In accordance with the above reference, the expression $1/(1+m)$ is set at a value in the range 0.6 to 1.0 to give a good picture quality. In this case, Eqs. (2) to (4) can be rewritten into the following equations.

$$T_i = \frac{X(I)}{X(I) + \sum_{i \in \Omega} \left(\frac{1}{K_p(X(I), X(P_i))} \cdot X(P_i)\right) + \sum_{i \in \Omega} \left(\frac{1}{K_b(X(I), X(B_i))} \cdot X(B_i)\right)} \times R \quad (10)$$

$$T_p = \frac{\frac{1}{K_p(X(I), X(P_i))} \cdot X(P_i)}{X(I) + \sum_{i \in \Omega} \left(\frac{1}{K_p(X(I), X(P_i))} \cdot X(P_i)\right) + \sum_{i \in \Omega} \left(\frac{1}{K_b(X(I), X(B_i))} \cdot X(B_i)\right)} \times R \quad (11)$$

$$T_b = \frac{\frac{1}{K_p(X(I), X(B_i))} \cdot X(B_i)}{X(I) + \sum_{i \in \Omega} \left(\frac{1}{K_p(X(I), X(P_i))} \cdot X(P_i)\right) + \sum_{i \in \Omega} \left(\frac{1}{K_b(X(I), X(B_i))} \cdot X(B_i)\right)} \times R \quad (12)$$

The following description explains a method for solving the second problem that it is impossible to compute activities because the luminance signal pixel values of the original picture are unknown.

The quantization scale Q of each macroblock in input picture compressed information is computed by using the luminance signal pixel values of the original picture in the encoding process. Since it is impossible to know the luminance signal pixel values of the original picture, the code quantity B and the quantization scale Q of each macroblock in the frame are extracted and stored in the information buffer 103 in the pre-parsing process carried out by the compressed information analysis unit 102 employed in the conventional picture information transformation apparatus shown in FIG. 11. At the same time, average values E(Q) of Q and E(B) of B or an average value E(QB) of their products are found in advance and stored in the information buffer 103.

The code quantity control unit 109 computes a normalized activity N_act in accordance with one of the following equations based on the values of the code quantity B and the quantization scale Q, which are stored in the information buffer 103.

$$N\_act = \frac{2Q + E(Q)}{Q + 2E(Q)} \quad (13)$$

$$N\_act = \frac{2QB + E(Q)E(B)}{QB + 2E(Q)E(B)} \quad (14)$$

-continued $$N\_act = \frac{2QB + E(QB)}{QB + 2E(QB)} \quad (15)$$

Eqs. (14) and (15) each represent equivalent processing. If the picture quality is evaluated in terms of the SNR, Eq. (13) provides a better picture quality. However, Eq. (14) or (15) gives a better subjective picture quality.

By the way, assume that the quantization value (quantization scale) of a macroblock in input picture compressed information is $Q_1$ and a quantization value computed in accordance with the above system for the macroblock in output picture compressed information is found in the code quantity control unit 109 to be $Q_2$. Even though the picture information transformation apparatus 100 shown in FIG. 12 is intended to reduce the code quantity, the relation $Q_1 > Q_2$ may hold true, indicating that the macroblock, which was once coarsely quantized is re-quantized more finely than the coarse quantization process. However, the amount of distortion caused by the coarse quantization process is not reduced by the finer re-quantization process. In addition, since more bits are allocated to this macroblock, the number of bits allocated to the other macroblock must be reduced, causing the picture quality to further deteriorate. Thus, for $Q_1 > Q_2$, control is executed to make $Q_1 = Q_2$.

By using Eq. (13), (14) or (15) given above, an activity can be computed.

As for stage 2 of the code quantity control executed by the code quantity control unit 109 employed in the picture information transformation apparatus 100 shown in FIG. 11, the same system as a system prescribed by MPEG2 Test Model 5 is adopted. The following description explains stage 2 prescribed in MPEG2 Test Model 5.

First of all, prior to a process of encoding a jth macroblock, the occupation sizes of the virtual buffer 212 for the I, P and B pictures are computed in accordance with Eqs. (16) to (18) respectively.

$$d_j^i = d_o^i + B_{j-1} - \frac{T_i \times (j-1)}{MB\_cnt} \quad (16)$$

$$d_j^p = d_o^p + B_{j-1} - \frac{T_p \times (j-1)}{MB\_cnt} \quad (17)$$

$$d_j^b = d_o^b + B_{j-1} - \frac{T_b \times (j-1)}{MB\_cnt} \quad (18)$$

where notations $T_i$, $T_p$ and $T_b$ denote target code quantities for each frame of the I, P and B pictures respectively, notations $d_0^i$, $d_0^p$ and $d_0^b$ denote initial occupation sizes of the virtual buffer 212 for the I, P and B pictures respectively and notation MB_cnt denotes the number of macroblocks included in 1 frame. The target code quantities $T_i$, $T_p$ and $T_b$ for each frame of the I, P and B pictures are computed in accordance with Eqs. (2), (3) and (4) or Eqs. (10), (11) and (12) respectively. A virtual buffer occupation size $d_{MB\_cnt}^i$ at the end of the process to encode the frame of an I picture is used as an initial occupation size $d_0^i$ of the virtual buffer for a next I picture. By the same token, a virtual buffer occupation size $d_{MB\_cnt}^p$ at the end of the process to encode the frame of a P picture is used as an initial occupation size $d_0^p$ of the virtual buffer for a next P picture. In the same way, a virtual buffer occupation size $d_{MB\_cnt}^b$ at the end of the process to encode the frame of a B picture is used as an initial occupation size $d_0^b$ of the virtual buffer for a next B picture.

Then, a reference quantization scale $Q_j$ for a jth macroblock is computed in accordance with Eq. (19).

$$Q_j = \frac{d_j \times 31}{r} \quad (19)$$

where notation r denotes a so-called reaction parameter for controlling a response speed of a feedback loop and is expressed by Eq. (20).

$$r = 2 \times \frac{bit\_rate}{picture\_rate} \quad (20)$$

It should be noted that, at the beginning of the sequence, the initial occupation sizes $d_0^i$, $d_0^p$ and $d_0^b$ of the virtual buffer 212 for the I, P and B pictures respectively have values expressed by Eq. (21).

$$d_0^i = \frac{10 \times r}{31}; \; d_0^o = K_p \cdot d_0^i; \; d_0^b = K_b \cdot d_0^b \quad (21)$$

Detailed configurations of the information buffer 103 and the code quantity control unit 109, which are employed in the picture information transformation apparatus 100, are shown in FIG. 12.

As shown in the figure, the information buffer 103 includes a code quantity buffer (frame buffer) 201, an average quantization scale computation unit 202, a quantization scale buffer 203, a code quantity buffer (macroblock buffer) 204, a picture type buffer 205, a complexity buffer 206, an average activity computation unit 207 and an activity buffer 208.

On the other hand, the code quantity control unit 109 includes a ring buffer 209, a GOP structure determination unit 210, a target code quantity computation unit 211, a virtual buffer 212 and an adaptive quantization unit 213.

The picture type buffer 205 and the code quantity buffer (frame buffer) 201 are used for storing respectively the picture type of a frame included in the MPEG2 picture compressed information input to the picture information transformation apparatus 100 and the quantity of code allocated to the frame. On the other hand, the quantization scale buffer 203 and the code quantity buffer (macroblock buffer) 204 are used for storing respectively the quantization scale of each macroblock of a frame and the quantity of code allocated to each macroblock of the frame.

The average quantization scale computation unit 202 computes an average quantization scale of the quantization scales of macroblocks included in a frame. As described above, the quantization scales are stored in the quantization scale buffer 203. The complexity buffer 206 is used for storing the complexity of a frame. The complexity of a frame is calculated from the average quantization scale of the frame computed by the average quantization scale computation unit 202 and the quantity of code allocated to the frame in accordance with Eq. (7). As described earlier, the code quantity for the frame is stored in the code quantity buffer (frame buffer) 201.

The activity buffer 208 is used for storing an activity of each macroblock in a frame. An activity of each macroblock in a frame is computed from the quantization scale of the macroblock stored in the quantization scale buffer 203 and the quantity of code allocated to the macroblock. As described earlier, the code quantity for the macroblock is stored in the code quantity buffer (macroblock buffer) 204. The average activity computation unit 207 computes an average activity of a frame from the activities of macroblocks included in the frames. As described earlier, the activities are stored in the activity buffer 208.

Information on the picture type of each frame in a GOP is transferred from the picture type buffer 205 to the ring buffer 209 employed in the code quantity control unit 109. The GOP structure determination unit 210 determines the structure of the GOP in output MPEG2 picture compressed information from information on the picture types of the GOP frames, which is stored in the ring buffer 209.

The target code quantity computation unit 211 computes a target code quantity of each frame of the output MPEG2 picture compressed information in accordance with Eqs. (2) to (4) or Eqs. (10) to (12) from the GOP structure of the output MPEG2 picture compressed. information and the complexity of the frame in the input MPEG2 picture compressed information. As described earlier, the GOP structure of the output MPEG2 picture compressed information is determined by the GOP structure determination unit 210, and the complexity of the frame in the input MPEG2 picture compressed information is stored in the complexity buffer 205. The occupation sizes of the virtual buffer 212 are updated in accordance with Eqs. (16) to (18) on the basis of the computed target code quantities.

The adaptive quantization unit 213 computes a quantization scale of a macroblock by using a reference quantization scale $Q_j$ of the macroblock and a normalized activity N_act computed in accordance with Eq. (13), (14) or (15). The reference quantization scale $Q_j$ of the macroblock is computed in accordance with Eq. (19) by using the occupation size of the virtual buffer 212. In the computation of the normalized activity N-act, the average activity for the frame and activities of macroblocks in the frame are used. The average activity for the frame is held by the average activity computation unit 207 and activities of macroblocks in the frame are stored in the activity buffer 208.

Feedback information obtained from the encoding process of the output MPEG2 picture compressed information is supplied to the target code quantity computation unit 211 and the virtual buffer 212.

FIG. 13 shows a flowchart representing processing carried out by the code quantity control unit 109. As shown in the figure, the flow begins with a step S100 at which a pseudo GOP is determined by pre-parsing as described above. Then, at the next step S101, a target code quantity of each frame is computed by using Eqs. (2) to (4). Subsequently, at the next step S102, code quantity control using the virtual buffer 212 is executed. The execution of the control of the code quantities corresponds to stage 2 of MPEG2 Test Model 5. Then, the flow of the processing goes on to a step S103 to carry out an adaptive quantization process based on an activity computed in a DCT domain by using Eq. (13), (14) or (15). Subsequently, at the next step S104, $Q_1$ is compared with $Q_2$. $Q_1$ is a quantization value (quantization scale) in the input picture compressed information while Q2 is a quantization value in the output picture compressed information. If $Q_1$ is found greater than $Q_2$, $Q_1$ is output. Otherwise, $Q_2$ is output. By controlling the code quantity in this way, a good picture quality can be obtained.

By the way, in order to make the adaptive quantization for each macroblock effective, it is desirable to sustain the reference quantization scale $Q_j$ for a frame at pretty uniform values throughout the screen. Eqs. (16) to (18) are each used to compute the occupation size of the virtual buffer 212 by assuming that code (or bits) are allocated uniformly to macroblocks included in each frame. Since the picture actually varies from frame to frame, however, the reference quantization scale $Q_j$ also varies over the screen, causing block distortion.

In addition, Eq. (21) is equivalent to an equation setting the reference quantization scale of macroblocks included in the first I picture at 10. In dependence on the picture and the code quantity, however, the value of 10 may not necessarily be appropriate, causing the picture quality to deteriorate in some cases.

SUMMARY OF THE INVENTION

It is thus an object of the present invention addressing the problems described above to provide a code quantity control apparatus, a code quantity control method, a picture information transformation apparatus and a picture information transformation method, which are described as follows.

According to an aspect of the present invention, there is provided a code quantity control apparatus employed in equipment including a decoding unit for inputting picture compressed information in accordance with a predetermined format and decoding the picture compressed information in a pixel domain or a frequency domain, wherein the picture compressed information includes at least an intraframe encoded picture, an interframe forward directional prediction encoded picture and a bi-directional prediction encoded picture and has completed an external encoding process based on discrete cosine transformation and motion compensation and encoding unit for encoding picture compressed information decoded by the decoding unit wherein code quantity control is executed in an internal encoding process for each macroblock on the basis of a virtual buffer by using information extracted from the picture compressed information input to the decoding unit.

The code quantity control apparatus provided by the present invention may compute an optimum value to be used as an initial value of a reference quantization scale and may keep the reference quantization scale at a fixed value throughout the frame. Thus, it is possible to output picture compressed information that avoids generation of block distortion and has a smaller code quantity.

According to another aspect of the present invention, there is provided a code quantity control method employed in method including the steps of inputting picture compressed information in accordance with a predetermined format and decoding the picture compressed information in a pixel domain or a frequency domain, wherein the picture compressed information includes at least an intraframe encoded picture, an interframe forward directional prediction encoded picture and a bi-directional prediction encoded picture and has completed an encoding process based on discrete cosine transformation and motion compensation and encoding the decoded picture compressed information by executing code quantity control for each macroblock on the basis of a virtual buffer by using information extracted from the input picture compressed information.

In accordance with the code quantity control method provided by the present invention, an optimum initial value of a reference quantization scale may be computed and the reference quantization scale may be kept at a fixed value throughout the frame. Thus, it is possible to output picture compressed information that avoids generation of block distortion and has a smaller code quantity.

According to still another aspect of the present invention, there is provided a picture information transformation method including a step of inputting picture compressed information in accordance with a predetermined format and decoding the picture compressed information in a pixel domain or a frequency domain, wherein the picture compressed information includes at least an intraframe encoded picture, an interframe forward directional prediction encoded picture and a bi-directional prediction encoded picture and has completed an encoding process based on discrete cosine transformation and motion compensation, a step of encoding the decoded picture compressed information by executing picture information transformation for each macroblock and a code quantity control process of controlling a code quantity of each macroblock on the basis of the virtual buffer by using information extracted from the input picture compressed information.

The picture information transformation method may be used for computing an optimum value to be used as an initial value of a reference quantization scale and may keep the reference quantization scale at a fixed value throughout the frame. Thus, it is possible to output picture compressed information that avoids generation of block distortion and has a smaller code quantity.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 2 is an explanatory diagram used for describing techniques for scanning picture compressed information in a variable length decoding unit employed in the picture information transformation apparatus; FIG. 2A shows a zigzag scanning technique; and FIG. 2B shows an alternate scanning technique;

FIG. 3 is an explanatory diagram used for describing typical operations carried out by a band limiting unit employed in the picture information transformation apparatus. FIG. 3A shows an operation to leave only 8×6 horizontal direction low-band components; and FIG. 3B shows an operation to leave only 8×4 horizontal direction low-band components;

FIG. 4 is an explanatory diagram used for describing an operation carried out by variable length decoding unit of the picture information transformation apparatus to eliminate 8×2 horizontal direction high band components of discrete cosine transformation coefficients of a block. FIG. 4A shows the coefficients prior to the elimination; and FIG. 4B shows the coefficients after the elimination;

FIG. 5 is an explanatory diagram used for describing the principle of operation of a motion compensation prediction unit employed in the picture information transformation apparatus for a case in which interpolation is carried out at ¼ picture precision by linear internal insertion;

FIG. 6 is an explanatory diagram used for describing 4-column discrete cosine transformation and inverse discrete cosine transformation processes based on Wang's fast algorithm;

FIG. 7 is an explanatory diagram used for describing matrixes each reflecting a sequence of processes in a method applied by an inverse discrete cosine transformation unit employed in the picture information transformation apparatus to processing of only 4 columns of horizontal direction low-band coefficients. FIG. 7A shows a discrete compression process and FIG. 7B shows an averaging process;

DETAILED DESCRIPTION OF THE PREFERRED EMBODIMENTS

Some preferred embodiments of the present invention are described by referring to some of the diagrams.

A picture information transformation apparatus implemented by an embodiment of the present invention is characterized in that the picture information transformation apparatus has an information buffer and a code quantity control unit. The following description begins with an explanation of the picture information transformation apparatus that has an information buffer and a code quantity control unit as configuration elements.

Figure 1:
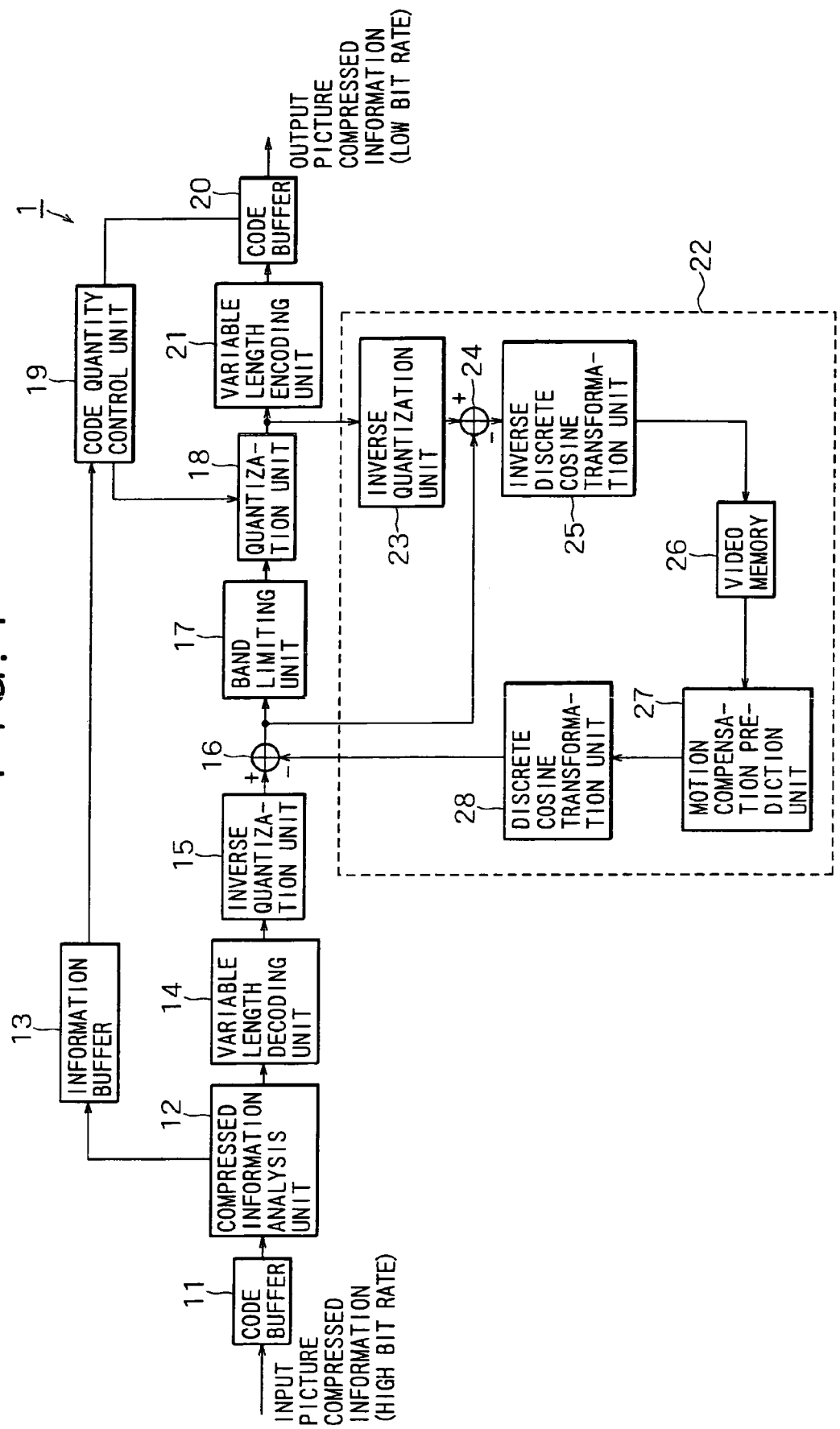
FIG. 1 is an explanatory diagram used for describing a complete structure of a picture information transformation apparatus implemented by an embodiment of the present invention.

FIG. 1 is a diagram showing the configuration of a picture information transformation apparatus 1 wherein pixel data is transferred from a decoding unit employed in the apparatus 1 to an encoding unit also employed in the apparatus 1 through a frequency domain. As shown in the figure, the picture information transformation apparatus 1 includes a code buffer 11, a compressed information analysis unit 12, an information buffer 13, a variable length decoding unit 14, an inverse quantization unit 15, an adder 16, a band limiting unit 17, a quantization unit 18, a code quantity control unit 19, a code buffer 20, a variable length encoding unit 21 and a motion compensation error correction unit 22. The motion compensation error correction unit 22 includes an inverse quantization unit 23, an adder 24, an inverse discrete cosine transformation unit 25, a video memory 26, a motion compensation prediction unit 27 and a discrete cosine transformation unit 28.

Next, the principle of operation of the picture information transformation apparatus 1 will be explained. First of all, code input in great quantities, that is, picture compressed information having a high bit rate, is stored in the code buffer 11. Since the picture compressed information has been encoded so as to satisfy a constraint condition of a VBV (Video Buffering Verifier) prescribed by the MPEG2 standard, neither overflow nor underflow occurs in the code buffer 11.

The picture compressed information stored in the code buffer 11 is then supplied to the compressed information analysis unit 12, which extracts information from the picture compressed information in accordance with a syntax prescribed by the MPEG2 standard. The information extracted by the compressed information analysis unit 12 is used in a re-encoding process to be described below. In particular, information such as q_scale for each macroblock and picture_coding type is required in operations carried out by the code quantity control unit 19, as will be described later, and is stored in the information buffer 13.

First, with regard to a direct current component of an intra macroblock, the variable length decoding unit 14 carries out a variable length decoding process on data encoded as a difference from an adjacent block and, with regard to other coefficients, the variable length decoding unit 14 carries out a variable length decoding process on data completing a run and level encoding process in order to produce 1-dimensional discrete cosine transformation coefficients. Then, the variable length decoding unit 14 rearranges the quantized discrete cosine transformation coefficients into 2-dimensional data on the basis of information on a technique of scanning the picture. The information on a technique of scanning the picture has also been extracted by the compressed information analysis unit 12 from the input picture compressed information. Typical scanning techniques include a zigzag scanning technique and an alternate scanning technique, which are shown in FIGS. 2A and 2B respectively. To be more specific, FIG. 2A is a diagram showing an 8×8 2-dimensional matrix including numbers of positions of the quantized discrete cosine transformation coefficients in the original 1-dimensional array, from which the matrix is produced by rearrangement based on the zigzag scanning technique. On the other hand, FIG. 2B is a diagram showing an 8×8 2-dimensional matrix including numbers of positions of the quantized discrete cosine transformation coefficients in the original 1-dimensional array, from which the matrix is produced by rearrangement based on the alternate scanning technique.

In the inverse quantization unit 15, the quantized discrete cosine transformation coefficients, which have been rearranged into 2-dimensional data as described above, are subjected to an inverse quantization process based on information on a quantization width (quantization scale) and information on a quantization matrix. These pieces of information are also extracted by the compressed information analysis unit 12 from the picture compressed information.

Discrete cosine transformation coefficients output by the inverse quantization unit 15 are supplied to the band limiting unit 17 for reducing the number of horizontal direction high band components for each block. FIGS. 3A and 3B are explanatory diagrams used for describing the processing carried out by the band limiting unit 17. To be more specific, FIG. 3A shows typical processing carried out on a luminance signal wherein only 8×6 coefficients representing horizontal direction high band components are left by elimination of horizontal direction high band components from the 8×8 discrete cosine transformation coefficients, that is, by setting the discrete cosine transformation coefficients of the horizontal direction high band components to zero. On the other hand, FIG. 3B shows typical processing carried out on a luminance signal wherein only 8×4 coefficients representing horizontal direction low-band components are left by elimination of horizontal direction high band components from the 8×8 discrete cosine transformation coefficients, that is, by setting the discrete cosine transformation coefficients of the horizontal direction high band components to zero. In FIGS. 3A and 3B, a black circle denotes a preserved coefficient while a white circle denotes a coefficient set at 0.

In the case of input picture compressed information completing coefficient rearrangement adopting a jump scanning technique, in a frame discrete cosine transformation mode, vertical direction high band components of the discrete cosine transformation coefficients include information on differences in time between frames. Thus, reducing the number of vertical direction high band components will cause the picture quality to deteriorate considerably. For this reason, no limitation is imposed on the band in the vertical direction. In addition, more band limitation can be carried out on a color difference signal than the luminance signal, which is taken as an example in the above description. This is because the eyes of a human can hardly detect deterioration in color difference signals, even though the eyes are capable of detecting deterioration in luminance signal with ease. As a result, it is possible to decrease the quantity of distortion caused by re-quantization while reducing the deterioration of the picture quality to a minimum.

It should be noted that processing carried out by the band limiting unit 17 is not limited to the typical ones shown in FIGS. 3A and 3B. For example, horizontal direction high band components can be multiplied by weight coefficients prepared in advance to produce the same effect instead of setting horizontal direction high band components to zero to eliminate the same.

In the picture information transformation apparatus 1 shown in FIG. 1, the 8×8 discrete cosine transformation coefficients output by the band limiting unit 17 are quantized by the quantization unit 18 at a quantization scale determined by the code quantity control unit 19 by adoption of a technique to be described later.

The discrete cosine transformation coefficients quantized by the quantization unit 18 are supplied to the variable length encoding unit 21 for carrying out a variable length encoding process. In the variable length encoding process, a difference between a predicted value and a direct current component of the discrete cosine transformation coefficients is encoded instead of directly encoding the direct current component itself. As the predicted value, a direct current component of the discrete cosine transformation coefficients of an immediately preceding block is used. Other components are encoded as follows. First of all, the discrete cosine transformation coefficients are re-arranged back into a 1-dimensional data array by adoption of a zigzag scanning technique or an alternate scanning technique, which was used in the arrangement of the 1-dimensional data array into the 2-dimensional matrix. The 1-dimensional data array is then subjected to a variable length encoding process by treating each pair including a run and a level in the array as an event. A run is a sequence of consecutive zero coefficients whereas a level is a non-zero coefficient. If remaining coefficients found in the scanning operation of a block are all zeros, a code known as an EOB (End of Block) is generated and the variable length encoding process carried out on the block is ended.

As described earlier, FIG. 2A is a diagram showing an 8×8 2-dimensional matrix including numbers of the positions of the quantized discrete cosine transformation coefficients in an 1-dimensional data array, which is reproduced by rearrangement of the matrix by adoption of the zigzag scanning technique. On the other hand, FIG. 2B is a diagram showing an 8×8 2-dimensional matrix including the numbers of the positions of the quantized discrete cosine transformation coefficients in an 1-dimensional data array, which is reproduced by rearrangement of the matrix by adoption of the alternate scanning technique. The number 0 is the discrete cosine transformation coefficient with which the scanning of the 8×8 2-dimensional matrix is started.

Assume that a block of discrete cosine transformation coefficients in the input picture compressed information is like the one shown in FIG. 4A. In the block shown in FIG. 4A, a black circle denotes a non-zero discrete cosine transformation coefficient while a white circle denotes a zero discrete cosine transformation coefficient. As described earlier, FIG. 3A shows a typical matrix in processing carried out on a luminance signal wherein only 8×6 coefficients representing horizontal direction low-band components are left by eliminating horizontal direction high band components from the 8×8 discrete cosine transformation coefficients, that is, by setting the discrete cosine transformation coefficients of the horizontal direction high band components to zero. A block of discrete cosine transformation coefficients, which is obtained as a result of the processing shown in FIG. 3A, is shown in FIG. 4B. There are more white circles in FIG. 4B than FIG. 3A because some of the 8×6 remaining horizontal direction low-band components have a value of 0 from the beginning. The block of discrete cosine transformation coefficients shown in FIG. 4B is rearranged back into a 1-dimensional array of discrete cosine transformation coefficients by using the zigzag scanning technique and is then re-encoded. In this case, the last re-encoded non-zero discrete cosine transformation coefficient is located at position number 50 (or scanning number 50) in the 1-dimensional array. If the alternate scanning technique is adopted for the coefficient rearrangements in place of the zigzag scanning technique, the last re-encoded non-zero discrete cosine transformation coefficient is located at position number 44 (or scanning number 44) in the 1-dimensional array. In the case of the alternate scanning technique adopted for this particular example, an EOB signal can thus be generated at a lower scanning number than the zigzag scanning technique. For this reason, the quantization width (quantization scale) can be set at a finer value than the quantization width for the zigzag scanning technique. As a result, the amount of distortion caused by quantization can be reduced.

Next, the cause of a motion compensation error is explained. Assume that the pixel value of an original picture is 0 and a quantization width of the input picture compressed information for the pixel value is $Q_1$. Let $Q_2$ be a quantization width for the pixel value in post re-encoding picture compressed information. Assume that the pixel value of a reference picture after a decoding process at the quantization width $Q_1$ is L ($Q_1$) and the pixel value of the reference picture after a decoding process at the quantization width $Q_2$ is L ($Q_2$).

In the MPEG2 picture information encoding apparatus, a pixel is subjected to an intermacroblock encoding process wherein, first of all, a difference O-L (Q1) is computed and then encoded by implementing discrete cosine transformation. Consider a configuration in which the motion compensation error correction unit 22 is eliminated from the picture information transformation apparatus 1 shown in FIG. 1. When picture compressed information output by a picture information transformation apparatus having such a configuration, which reduces the code quantity of the picture compressed information, is supplied to an MPEG2 picture information decoding apparatus for decoding the picture compressed information, the picture compressed information is decoded by assuming that discrete cosine transformation coefficients in the picture compressed information have been encoded by encoding the differences 0-L ($Q_2$) in an encoding process including discrete cosine transformation. In the picture information transformation apparatus 1 shown in FIG. 1, in general, the relation $Q_1=Q_2$ does not hold true. Since this phenomenon occurs for P and B pictures, a motion compensation error is generated. As described earlier, a P picture is a picture encoded by forward directional prediction based on a plurality of previously encoded-frames, and a B picture is a picture encoded by bi-directional prediction based on previously encoded frames as well as frames to be encoded at later times.

In addition, encoded picture quality deterioration generated in a specific P picture is propagated to a subsequent P picture and a B picture using the specific P picture as a reference picture, causing more severe deterioration in picture quality. Such phenomena are a cause of accumulation of errors accompanying motion compensations at the later stage of a GOP (Group of Pictures). The errors accompanying motion compensations cause the picture quality to deteriorate, but good picture quality is restored at the beginning of the next GOP, resulting in a phenomenon known as drift.

The following description explains the principle of operation of the motion compensation error correction unit 22 for eliminating such motion compensation errors. Quantized discrete cosine transformation coefficients output by the quantization unit 18 are supplied to both the variable length encoding unit 21 and the inverse quantization unit 23. The inverse quantization unit 23 carries out an inverse quantization process based on information on a quantization matrix and a quantization scale. The adder 24 computes a difference between a discrete cosine transformation coefficient output by the inverse quantization unit 23 and a discrete cosine transformation coefficient output by the inverse quantization unit 15. The adder 24 supplies the difference to the inverse discrete cosine transformation unit 25 for carrying out an inverse discrete cosine transformation process. The output of the inverse discrete cosine transformation unit 25 is stored in the video memory 26 as motion compensation error correction information. The motion compensation prediction unit 27 carries out a motion compensation process based on information on a motion compensation prediction mode in the input picture compressed information, a motion vector and the difference stored in the video memory 26. The information on a motion compensation prediction mode includes a field motion compensation prediction mode or a frame motion compensation prediction mode and a forward directional prediction mode, a backward directional prediction mode or a bi-directional prediction mode. Data obtained as a result of the motion compensation process is an error compensation value in the pixel domain. Receiving this error compensation value in the pixel domain, the discrete cosine transformation unit 28 carries out a discrete cosine transformation process to generate an error correction value in the frequency domain.

The inverse discrete cosine transformation unit 25 and the discrete cosine transformation unit 28 may adopt a fast algorithm like the one disclosed in reference titled "A Fast Computational Algorithm for the Discrete Cosine Transform, (IEEE Trans. Commun., Vol. 2.5, No. 9, pp. 1,004 to 1,009, 1977)".

The inverse discrete cosine transformation unit 25 may eliminate the inverse discrete cosine transformation process for horizontal direction high band coefficients, which have each been set at 0 by the band limiting unit 17. By the same token, the discrete cosine transformation unit 28 may eliminate the discrete cosine transformation process for the horizontal direction high band coefficients. As a result, the circuit scale and the amount of processing can be reduced.

In addition, since the eyes of a human being can hardly detect deterioration in color difference signals, even though the eyes are capable of detecting deterioration in luminance signals with ease as described above, the process to correct a motion prediction error can be applied only to the luminance signal. It is thus possible to considerably reduce the circuit scale and the amount of processing while reducing the deterioration in picture quality to a minimum.

Furthermore, while an error generated in a P picture is propagated to a B picture, an error generated in a B picture is not further propagated to any picture. By the way, a B picture includes information to be processed in a bi-directional prediction mode so that the amount of processing increases substantially. Thus, by applying the process to correct a motion prediction error to P pictures only, it is possible to considerably reduce the circuit scale and the amount of processing while reducing the deterioration in picture quality to a minimum. By not applying the process to correct a motion prediction error to B pictures, the size of the video memory 26 can be reduced.

Moreover, in the motion compensation error correction unit 22 employed in the picture information transformation apparatus 1 shown in FIG. 1, all of the 8×8 discrete cosine transformation coefficients are used as error correction components. Thus, in particular, if a frame DCT mode is used as the discrete cosine transformation mode and the jump scanning technique is adopted as the method for scanning the input picture compressed information, ignoring errors for vertical direction high band coefficients will cause the picture quality to deteriorate considerably. As for the horizontal direction, however, ignoring up to 4 high band components hardly causes deterioration in picture quality. Taking advantage of this fact, it is possible to reduce the amount of processing carried out by the discrete cosine transformation unit 28 and the size of the video memory 26 while reducing the deterioration in picture quality to a minimum. That is to say, the inverse discrete cosine transformation unit 25 and the discrete cosine transformation unit 28 carry out their respective portions of normal 8-row processing in the vertical direction but carry out their respective portions of 4-column processing in the horizontal direction. Thus, the horizontal direction resolution of the video memory 26 is reduced by ½ and the size of the video memory 26 can be decreased accordingly.

In this case, however, motion compensation processing at ¼ pixel precision is required in the motion compensation prediction unit 27. By carrying out this processing through linear internal insertion in accordance with the values of motion vectors in the picture compressed information as shown in FIG. 5, it is possible to sufficiently suppress picture quality deterioration caused by a motion compensation error.

As the processing in the horizontal direction, the following two means are conceivable. In accordance with the first means, first of all, the inverse discrete cosine transformation unit 25 carries out a 4-column inverse discrete cosine transformation process on low-band discrete cosine transformation coefficients on 4 columns only. The low-band discrete cosine transformation coefficients on 4 columns are left among the low-band discrete cosine transformation coefficients on all 8 columns. Then, the discrete cosine transformation unit 28 carries out a 4-column discrete cosine transformation process in the horizontal direction on each block of the 4×8 error correction values in the pixel domain. The error correction values in the pixel domain are a result of a motion compensation process carried out by the motion compensation prediction unit 27 on the basis of information on a motion compensation prediction mode in the input picture compressed information, a motion vector and the difference stored in the video memory 26. As a result of the 4-column discrete cosine transformation process carried out by the discrete cosine transformation unit 28, 4×8 error correction values in the frequency domain are produced.

By adopting a fast algorithm for the 4-column inverse discrete cosine transformation process and the 4-column discrete cosine transformation process, the amount of processing can be further reduced. FIG. 6 is a diagram showing a method based on Wang's algorithm described in a reference titled "Fast Algorithms for the Discrete W Transform and the Discrete Fourier Transform," authored by Zhong de Wang, IEEE Tr. ASSP-32, No. 4, pp. 803 to 816, August, 1984.

In FIG. 6, F (0) to F (3) are 4 low-band coefficients. An adder 301 adds the coefficient F (0) to the coefficient F (2). On the other hand, an adder 302 adds the coefficient F (0) to the inverted value of the coefficient F (2), that is, subtracts the coefficient F (2) from the coefficient F (0). A multiplier 303 multiplies a sum output by the adder 301 by a coefficient A (=1/0.2). A product output by the multiplier 303 is supplied to adders 313 and 314. On the other hand, a multiplier 304 multiplies a difference output by the adder 302 by the coefficient A. A product output by the multiplier 304 is supplied to adders 311 and 312.

In the mean time, an adder 305 adds the coefficient F (3) to the inverted value of the coefficient F (1), that is, subtracts the coefficient F (1) from the coefficient F (3). A multiplier 308 multiplies a difference output by the adder 305 by a coefficient D (=$C_{3/8}$). The value of $C_{3/8}$ will be described later. A product output by the multiplier 308 is supplied to an adder 310. The inverted value of the product output by the multiplier 308 is supplied to an adder 309.

A multiplier 306 multiplies the coefficient F (3) by a coefficient B (=$-C_{1/8}+C_{3/8}$) and supplies the product to an adder 309. On the other hand, a multiplier 307 multiplies the coefficient F (1) by a coefficient C (=$C_{1/8}+C_{3/8}$) and supplies the product to an adder 310. The value of $C_{1/8}$ will be described later.

The adder 309 adds a product output by the multiplier 306 to the inverted value of a product output by the multiplier 308, that is, subtracts the product output by the multiplier 308 from the product output by the multiplier 306. On the other hand, the adder 310 adds a product output by the multiplier 307 to the product output by the multiplier 308. A sum output by the adder 309 is supplied to the adder 311 whereas the inverted value of the sum output by the adder 309 is supplied to an adder 312. A sum output by the adder 310 is supplied to an adder 313 whereas the inverted value of the sum output by the adder 310 is supplied to an adder 314.

The adder 311 adds a product output by the multiplier 304 to a difference output by the adder 309. The adder 312 adds the product output by the multiplier 304 to the absolute value of the difference output by the adder 309, that is, subtracts the difference output by the adder 309 from the product output by the multiplier 304. On the other hand, the adder 313 adds a product output by the multiplier 303 to a sum output by the adder 310, whereas the adder 314 adds the product output by the multiplier 303 to the inverted value of the sum output by the adder 310, that is, subtracts the sum output by the adder 310 from the product output by the multiplier 303.

The output of the adder 313 is a coefficient f (0) obtained as a result of the 4-column inverse discrete cosine transformation process. By the same token, the outputs of the adders 311, 312 and 314 are respectively coefficients f (1), f (2) and f (3), which are each obtained as a result of the 4-column inverse discrete cosine transformation process.

As described above, in accordance with the algorithmic configuration shown in FIG. 6, the 4-column inverse discrete cosine transformation process can be implemented by employing 9 adders and 5 multipliers. It should be noted that the value of $C_{3/8}$ are expressed by Eq. (22).

$$C_{3/8} = \cos(3\pi/8) \quad (22)$$

If the coefficients f (0) to f (3) are supplied to the algorithmic configuration shown in FIG. 6 to generate coefficients F (0) to F (3), the configuration will serve as an algorithm for the 4-column discrete cosine transformation process.

In accordance with the second means, on the other hand, first of all, the inverse discrete cosine transformation unit 25 carries out processing in the horizontal direction by executing the steps of replacing the 4-column high band coefficients with zeros, performing an 8-column inverse discrete cosine transformation process and carrying out a thinning or averaging process to produce error correction values at 4 points in the pixel domain. Then, the discrete cosine transformation unit 28 executes the steps of carrying out an interpolation process on the error correction values at 4 points in the pixel domain, which have been obtained by motion compensation, to generate error correction values at 8 points in the pixel domain, carrying out a discrete cosine transformation process on the error correction values at 8 points in the pixel domain and extracting 4-column low-band coefficients. Thus, 4×8 error correction values in the frequency domain result.

As described above, in portions of the processing carried out by the inverse discrete cosine transformation unit and the discrete cosine transformation unit, matrixes each reflecting a series of processes are found in advance and, by directly carrying out an inverse discrete cosine transformation process and a discrete cosine transformation process on coefficients serving as elements of the matrixes, the amount of processing can be further reduced.

Let notation $D_{4\_deci}$ denote a matrix reflecting a series of processes for a case in which the inverse discrete cosine transformation unit 25 carries out processing in the horizontal direction by executing the steps of replacing the 4-column high band coefficients with zeros, performing an 8-column inverse discrete cosine transformation process and carrying out a thinning process. By the same token, let notation $D_{4\_ave}$ denote a matrix reflecting a series of processes for a case in which the inverse discrete cosine transformation unit 25 carries out processing in the horizontal direction by executing the steps of replacing the 4-column high band coefficients with zeros, performing an 8-column inverse discrete cosine transformation process and carrying out an averaging process. The matrixes $iD_{4\_deci}$ and $iD_{4\_ave}$ are shown in FIGS. 7A and 7B respectively. The matrixes $D_{4\_deci}$ and $D_{4\_ave}$ satisfy Eqs. (23) and (24) respectively.

$$D_{4\_deci} = {}^t(iD_{4\_deci}) \quad (23)$$

$$D_{4\_ave} = {}^t(iD_{4\_ave}) \quad (24)$$

where notation $^t(\ )$ indicates a transposed matrix.

Figure 8:
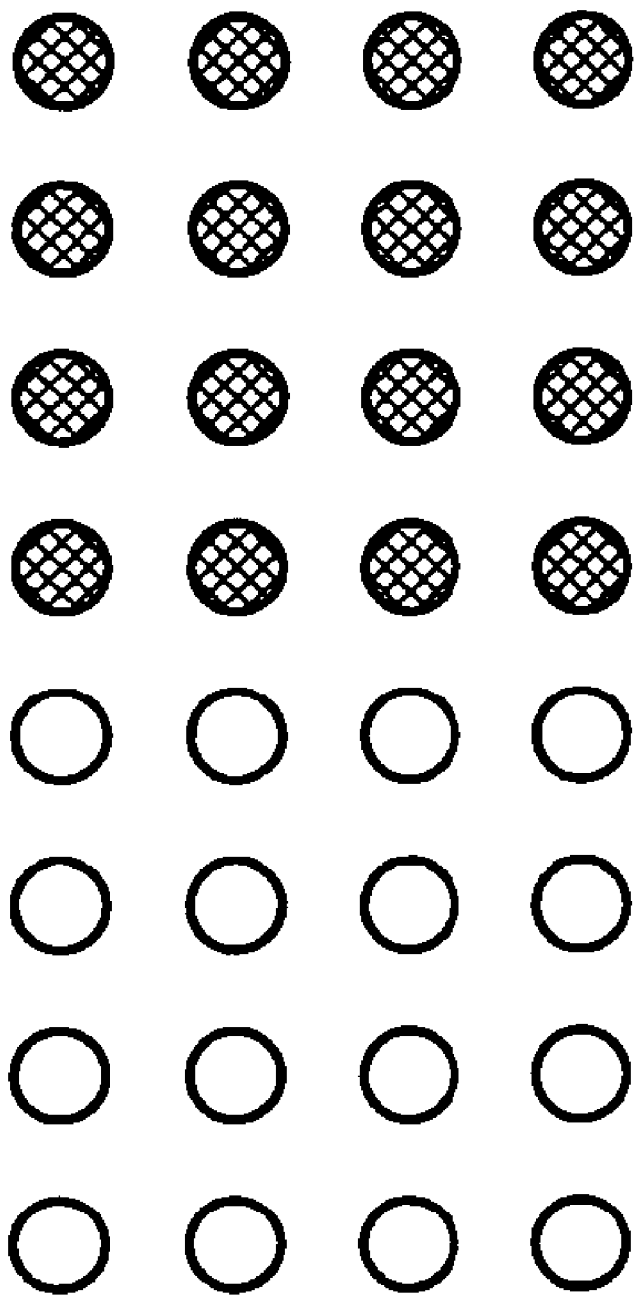
FIG. 8 is an explanatory diagram used for describing a method of further reducing the amount of processing for a color difference signal in the inverse discrete cosine transformation unit and the discrete cosine transformation unit, which are employed in the picture information transformation apparatus.

In addition, in general, the eyes of a human being can hardly deterioration in color difference signal, even though the eyes are capable of detecting deterioration in luminance signals with ease, as is commonly known. Thus, with regard to the color difference signal, the amount of processing can be further reduced. Specifially, among the 4×8 error correction signals described above, typically only 4×4 vertical direction low-band coefficients like those shown in FIG. 8 are used in correction processes carried out by the inverse discrete cosine transformation unit 25 and the discrete cosine transformation unit 28 with regard to error correction components of the color difference signal. In this case, the unused high band coefficients are each set at 0. By doing so, it is possible to further reduce the amount of processing in the error correction process.

In accordance with a method adopted in MPEG2 Test Model 5 (ISO/IEC JTC1/SC29/WG11 No. 400), the number of bits allocated to each picture in a GOP (Group of Pictures) is determined. This determination of the number of bits allocated to each picture in a GOP is referred to hereafter as stage 1. The determination of the number of bits allocated to each picture in a GOP is based on the number of bits to be allocated to unencoded pictures in the GOP. The unencoded pictures include pictures each serving as an object of bit allocation. A quantization scale is found by feedback control executed in macroblock units on the basis of the sizes of 3 types of virtual buffers set independently for each picture in order to make the number of bits allocated to each picture, which is found at stage 1, match an actual code quantity. The operation to find a quantization scale is referred to hereafter as stage 2. A quantization scale found at stage 2 is changed in accordance with an activity of each macroblock so as to result in finer quantization for the even portion of the picture, which easily allows deterioration to become visually noticeable, and coarser quantization for the complicated portion of the picture, which substantially prevents the deterioration from becoming visually noticeable. The operation to change quantization scales is referred to hereafter as stage 3. The MPEG2 picture information encoding apparatus put to practical use also executes code quantity control in accordance with an algorithm conforming to the method prescribed by Test Model 5.

In order to apply this system to the encoding unit of the picture information transformation apparatus 1 shown in FIG. 1, two things need to be done. At stage 1 described above, a pseudo GOP is defined, and code quantity control is executed on the basis of the defined pseudo GOP. The pseudo GOP includes I, P and B pictures. An I picture is a picture encoded in an encoding process based on information in one frame, that is, the information in the frame of the picture only. A P picture is a picture encoded by forward directional prediction based on a plurality of previously encoded frames (pictures). A B picture is a picture encoded by bi-directional prediction based on previously encoded frames as well as frames to be encoded at later times. The length of a pseudo GOP, that is, the number of pictures composing the pseudo GOP, varies in dependence on how a frame of picture compressed information is detected as an I picture. In addition, at stage 3 described above, a normalized activity is computed. These two things will be described in concrete terms later.

Figure 9:
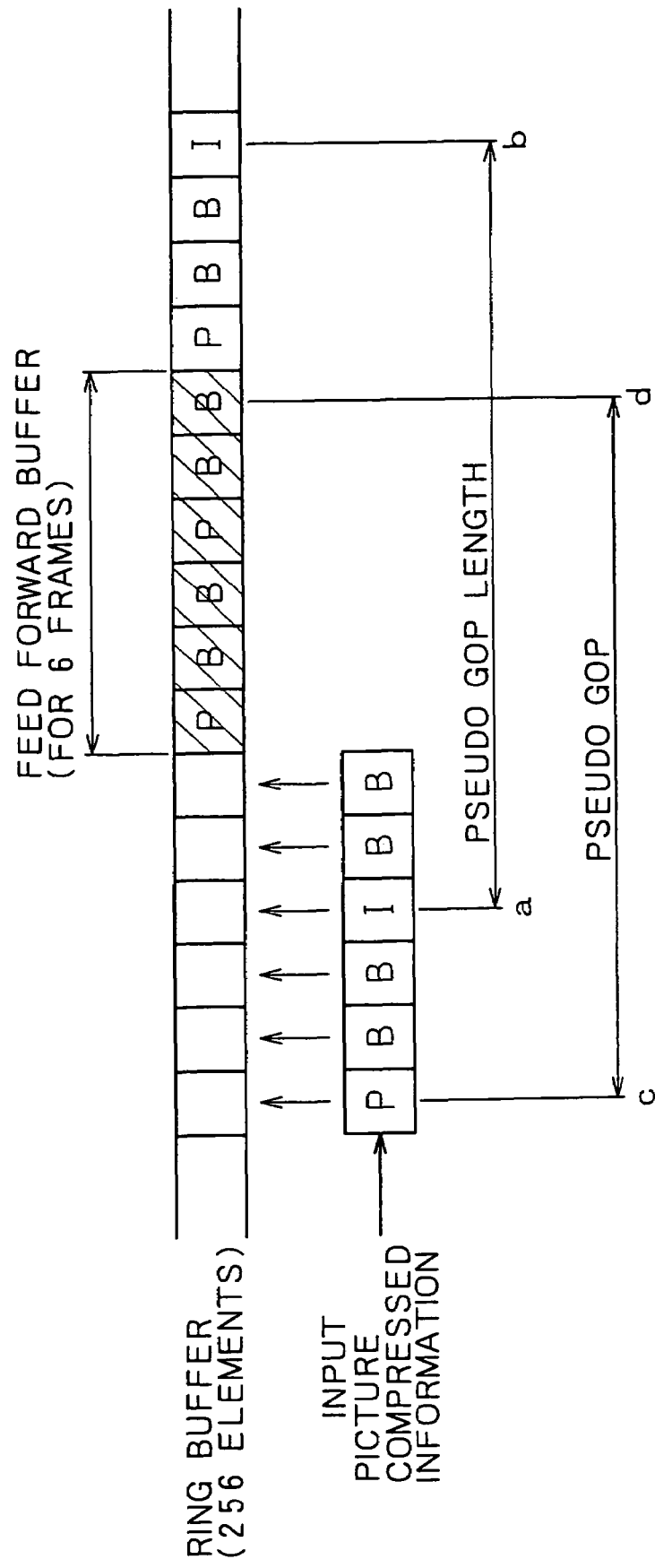
FIG. 9 is an explanatory diagram used for describing a method adopted by a code quantity control unit of the picture information transformation apparatus to determine the structure of a pseudo GOP.
Figure 10:
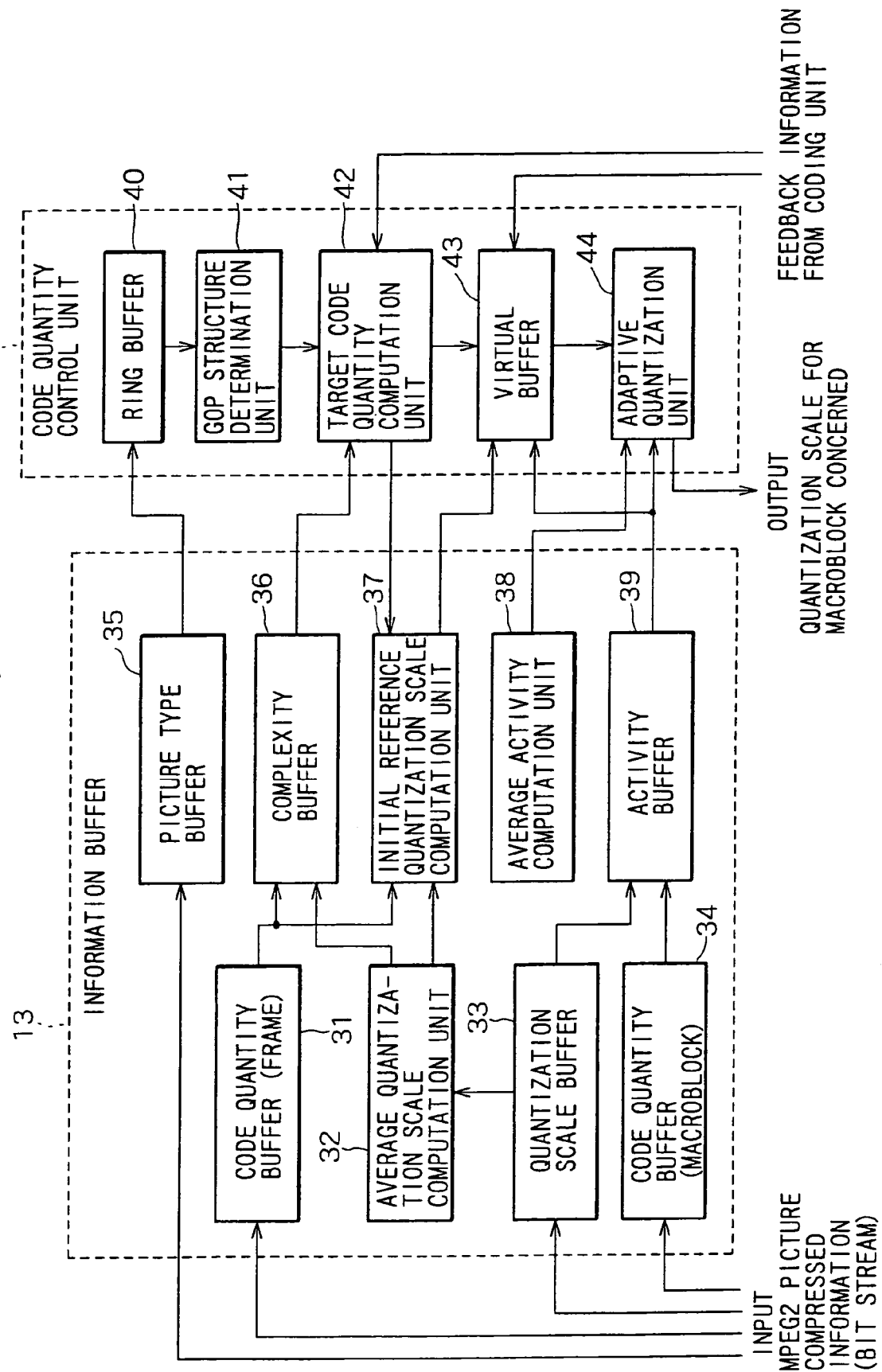
FIG. 10 is an explanatory diagram used for describing the configurations of the code quantity control unit and an information buffer, which are employed the picture information transformation apparatus.
Figure 11:
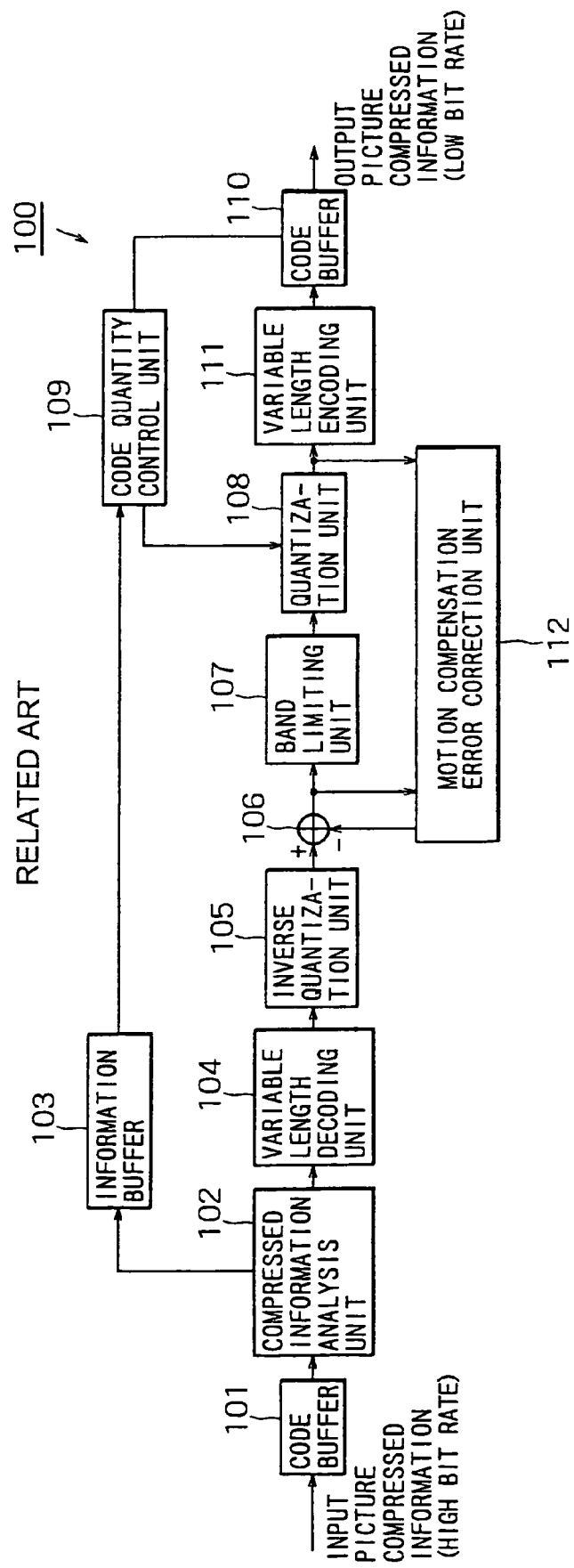
FIG. 11 is an explanatory diagram used for describing the configuration of the conventional picture information transformation apparatus.
Figure 12:
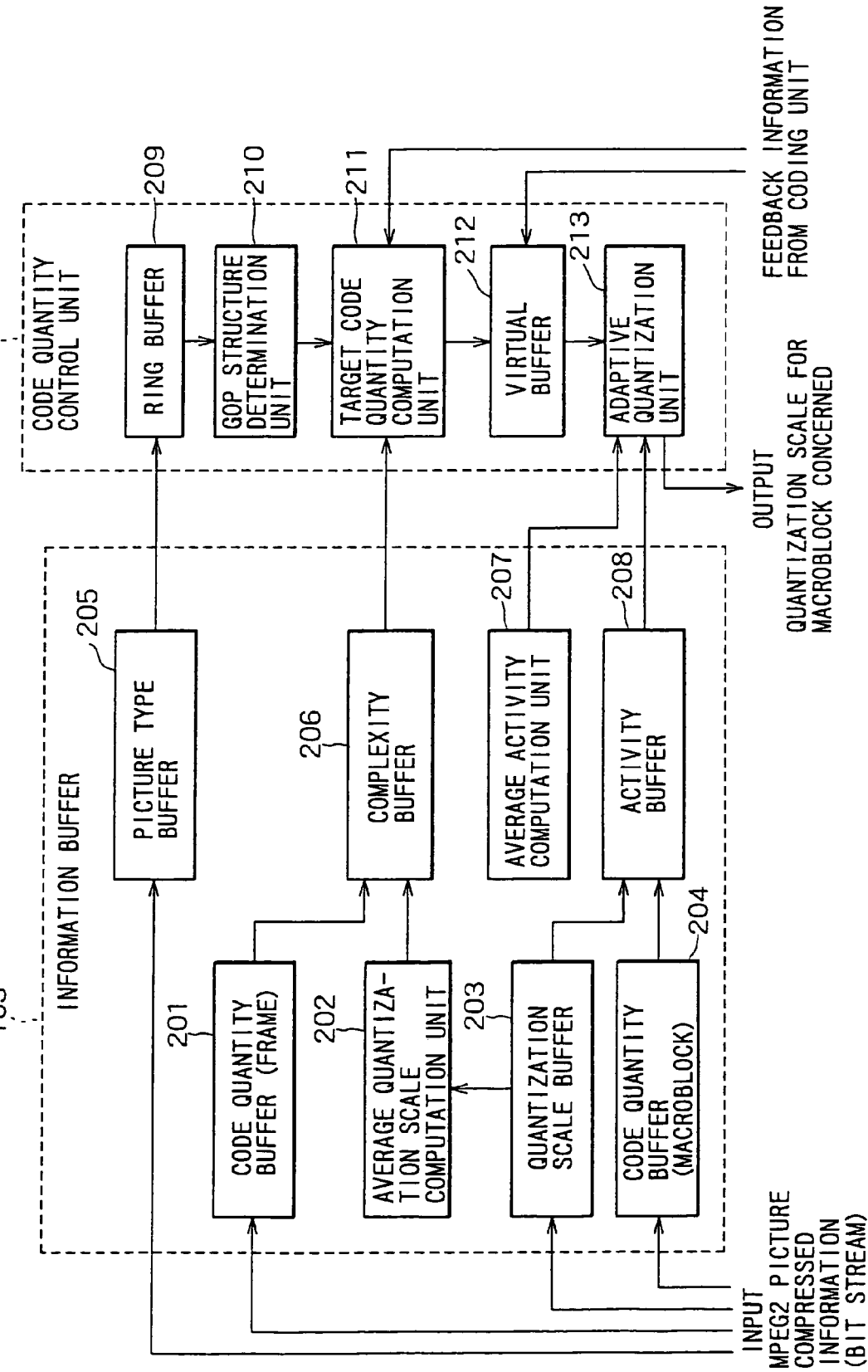
FIG. 12 is an explanatory diagram used for describing the configurations of a code quantity control unit and an information buffer, which are employed in the conventional picture information transformation apparatus.
Figure 13:
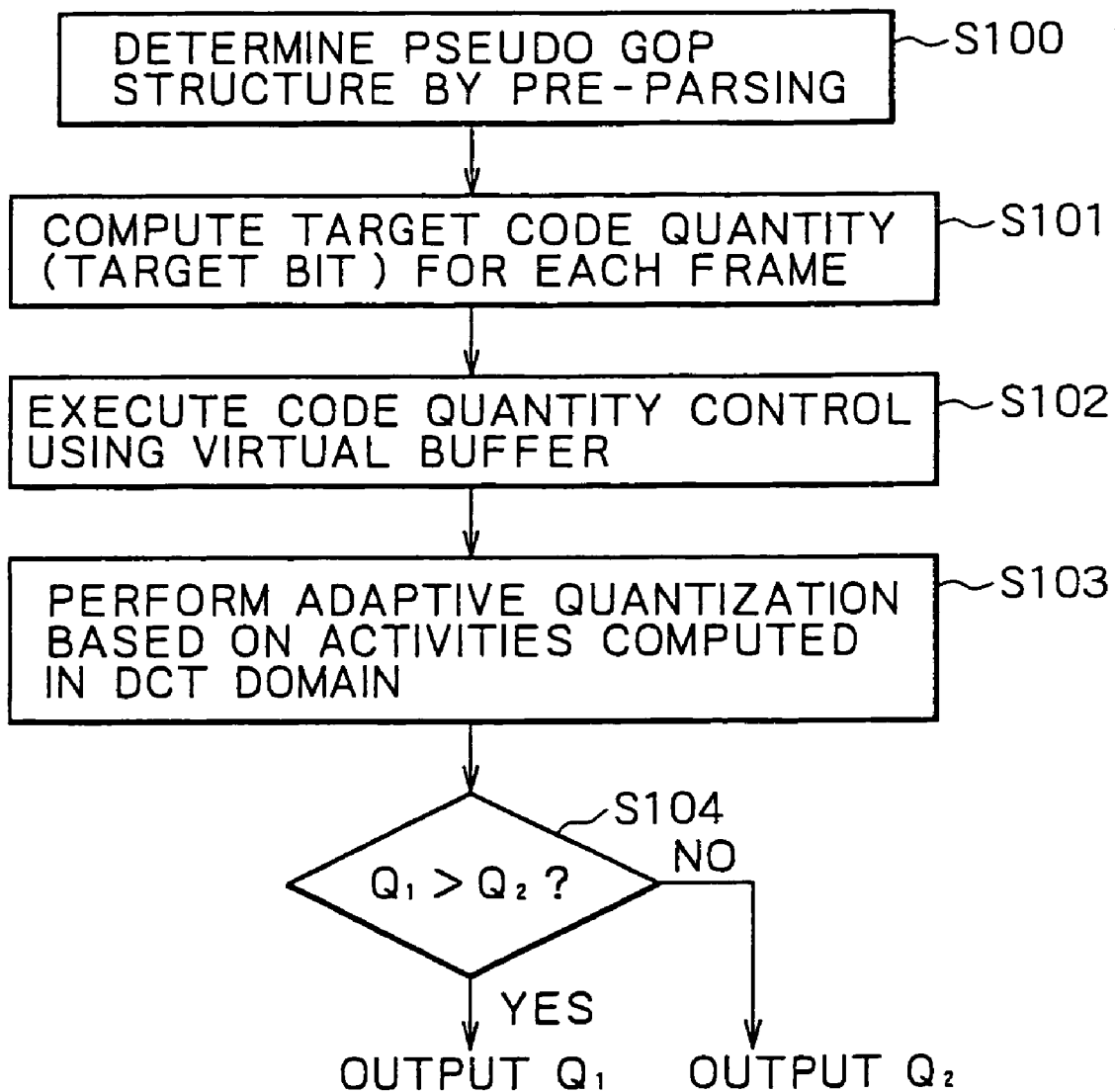
FIG. 13 is a flowchart representing operations carried out by the code quantity control unit employed in the conventional picture information transformation apparatus.

The following description explains how a pseudo GOP is structured by referring to FIG. 10. The information buffer 13 shown in FIG. 1 has a ring buffer for storing picture_coding_type information as shown in FIG. 9. The ring buffer has a storage capacity large enough for storing as many pieces of picture_coding_type information as frames (or pictures) that 1 GOP can include as prescribed by the MPEG standard. The maximum number of frames included in 1 GOP is 256. Each storage element in the ring buffer is set at an initial value at the beginning.

By referring to an example shown in FIG. 9, consider a case in which processing has been completed for 6 frames in input picture compressed information as P, B, B, I, B and B pictures respectively, and a next frame is to be processed as a P picture. At that time, first of all, a feed forward buffer employed in the compressed information analysis unit 12 shown in FIG. 1 is used for storing pieces of picture_coding_type information, which are read out ahead for some following frames, and uses the pieces of information to update the storage elements of the ring buffer. The feed forward buffer may have any arbitrary size. In the case of the example shown in FIG. 9, the feed forward buffer is capable of accommodating information for up to 6 frames.

Next, the length of a pseudo GOP is determined by referencing pointer a pointing to the present I picture and pointer b pointing to the next I picture as shown in FIG. 9.

Finally, from pointer d pointing to the last frame stored in the feed forward buffer and the length of the pseudo GOP determined as described above, the structure of the pseudo GOP can be determined as shown in FIG. 9.

For a pseudo GOP having a structure of $\{B_1, B_2, P_1, B_3, B_4, I_1, B_5, B_6, ---, P_L, B_{M-1}$ and $B_M\}$ as determined by adopting the technique described above, the size L_pgop of the pseudo GOP is expressed by the following equation:

$$L\_pgop = 1 + L + M \quad (25)$$

For the pseudo GOP, target code quantities $T_i$, $T_p$ and $T_b$ Of the I, P and B pictures are expressed by Eqs. (26), (27) and (28) respectively.

$$T_i = \frac{K_p K_b X(I)}{K_p K_b X(I) + K_b \sum_{i \in \Omega} X(P_i) + K_p \sum_{i \in \Omega} X(B_i)} \times R \quad (26)$$

$$T_p = \frac{K_b X(P)}{K_p K_b X(I) + K_b \sum_{i \in \Omega} X(P_i) + K_p \sum_{i \in \Omega} X(B_i)} \times R \quad (27)$$

$$T_b = \frac{K_p X(B)}{K_p K_b X(I) + K_b \sum_{i \in \Omega} X(P_i) + K_p \sum_{i \in \Omega} X(B_i)} \times R \quad (28)$$

where notations and denote an already encoded frame in the pseudo GOP and the frame of the pseudo GOP to be encoded respectively. Let notations F and B denote a frame rate and the code quantity of output picture compressed information. In this case, Eqs. (29) and (30) are obtained as follows.

$$R_0 = \frac{B}{F} \times L\_pgop \quad (29)$$

$$R = R_0 - \sum_{x \in \Theta} \text{generated\_bit}(x) \quad (30)$$

Notation X (.) denotes a global complexity measure parameter representing the complexity of a frame. Let notations Q and S denote respectively the average quantization scale and the total code quantity of the frame, which are found in advance during a pre-parsing process carried out by the compressed information analysis unit 12 shown in FIG. 1. In this case, this global complexity measure parameter can be expressed by Eq. (31) as follows.

$$X = S \cdot Q \quad (31)$$

As prescribed in MPEG2 Test Model 5, notations $K_p$ and $K_b$ denote a ratio of the quantization scale of the P picture to the quantization scale of the I picture and a ratio of the quantization scale of the B picture to the quantization scale of the I picture respectively. With the ratios having values indicated by Eq. (32), the picture quality as a whole is assumed to be always optimized.

$$K_p = 1.0; K_b = 1.4 \quad (32)$$

Instead of using the values given in Eq. (32), as a conceivable alternative, the ratios $K_p$ and $K_b$ can also be computed dynamically from the complexity of each frame of input MPEG2 picture compressed information, as is described in a reference titled "Theoretical Analysis of MPEG Compression Rate and Application to Code Quantity Control," (Shingakugihou, IE-9, DSP95-1, May 1995). To put it concretely, the values of the ratios $K_p$ and $K_b$ are also given by Eq. (33) in place of those given by Eq. (32).

$$K_p(X(I), X(P_i)) = \left(\frac{X(I)}{X(P_i)}\right)^{\frac{1}{1+m}}; K_b(X(I), X(B_i)) = \left(\frac{X(I)}{X(B_i)}\right)^{\frac{1}{1+m}} \quad (33)$$

In accordance with the above reference, the expression 1/(1+m) is set at a value in the range 0.6 to 1.0 to give a good picture quality. In this case, Eqs. (26) to (28) can be rewritten into the following equations.

$$T_i = \frac{X(I)}{X(I) + \sum_{i \in \Omega} \left(\frac{1}{K_p(X(I), X(P_i))} \cdot X(P_i)\right) + \sum_{i \in \Omega} \left(\frac{1}{K_b(X(I), X(B_i))} \cdot X(B_i)\right)} \times R \quad (34)$$

$$T_p = \frac{\frac{1}{K_p(X(I), X(P_i))} \cdot X(P_i)}{X(I) + \sum_{i \in \Omega} \left(\frac{1}{K_p(X(I), X(P_i))} \cdot X(P_i)\right) + \sum_{i \in \Omega} \left(\frac{1}{K_b(X(I), X(B_i))} \cdot X(B_i)\right)} \times R \quad (35)$$

$$T_b = \frac{\frac{1}{K_b(X(I), X(B_i))} \cdot X(B_i)}{X(I) + \sum_{i \in \Omega} \left(\frac{1}{K_p(X(I), X(P_i))} \cdot X(P_i)\right) + \sum_{i \in \Omega} \left(\frac{1}{K_b(X(I), X(B_i))} \cdot X(B_i)\right)} \times R \quad (36)$$

The following description explains computation of a normalized activity at stage 3. The quantization scale Q of each macroblock in input picture compressed information is computed by using the luminance signal pixel values of the original picture in the encoding process. The code quantity B and the quantization scale Q of each macroblock in the frame are extracted and stored in the information buffer 13 in a pre-parsing process carried out by the compressed information analysis unit 12 shown in FIG. 1. At the same time, average values E(Q) of Q and E(B) of B or an average value E(QB) of their products are found in advance and stored in the information buffer 13.

The code quantity control unit 19 computes a normalized activity N_act in accordance with one of the following equations based on the values of the code quantity B and the quantization scale Q, which are stored in the information buffer 13.

$$N\_act = \frac{2Q + E(Q)}{Q + 2E(Q)} \quad (37)$$

$$N\_act = \frac{2QB + E(Q)E(B)}{QB + 2E(Q)E(B)} \quad (38)$$

$$N\_act = \frac{2QB + E(QB)}{QB + 2E(QB)} \quad (39)$$

Eqs. (38) and (39) each represent equivalent processing. If the picture quality is evaluated in terms of the SNR, Eq. (37) provides a better picture quality. However, Eq. (38) or (39) gives a better subjective picture quality.

By the way, assume that the quantization value of a macroblock in input picture compressed information is $Q_1$, and a quantization value computed in accordance with the above system for the macroblock in output picture compressed information is found in the code quantity control unit 19 to be $Q_2$. Even though the picture information transformation apparatus 1 shown in FIG. 1 is intended to reduce the code quantity, a relation $Q_1 > Q_2$ may hold true, indicating that the macroblock, which was once coarsely quantized is re-quantized more finely than the coarse quantization process. However, the amount of distortion caused by the coarse quantization process is not reduced by the finer re-quantization process. In addition, since more bits are allocated to this macroblock, the number of bits allocated to other macroblock must be reduced, causing the picture quality to further deteriorate. Thus, for $Q_1 > Q_2$, control is executed to make $Q_1 = Q_2$.

In order to make the adaptive quantization processes expressed by Eqs. (37) to (39) for each macroblock effective, it is desirable to sustain the reference quantization scale $Q_j$ for a frame at pretty uniform values throughout the screen. The code quantity control apparatus and the code quantity control method, which are provided by the present invention, are characterized in that calculation is carried out so as to sustain the reference quantization scale at pretty uniform values throughout the screen.

Before explaining a method to sustain the reference quantization scale at all but uniform values throughout the screen, detailed configurations of the information buffer 13 and the code quantity control unit 19, which are employed in the picture information transformation apparatus 1, are described.

As shown in FIG. 10, the information buffer 13 includes a code quantity buffer (frame buffer) 31, an average quantization scale computation unit 32, a quantization scale buffer 33, a code quantity buffer (macroblock buffer) 34, a picture type buffer 35, a complexity buffer 36, an initial reference quantization scale computation unit 37, an average activity computation unit 38 and an activity buffer 39. On the other hand, the code quantity control unit 19 includes a ring buffer 40, a GOP structure determination unit 41, a target code quantity computation unit 42, a virtual buffer 43 and an adaptive quantization unit 44.

The picture type of each frame included in MPEG2 picture compressed information input to the picture information transformation apparatus 1 is stored in the picture type buffer 35. On the other hand, the quantity of code to be allocated to each frame included in MPEG2 picture compressed information input to the picture information transformation apparatus 1 is stored in the code quantity buffer (frame buffer) 31. In addition, the quantization scale for each block included in a frame is stored in the quantization scale buffer 33. On the other hand, the quantity of code to be allocated to each macroblock included in a frame is stored in the code quantity buffer (macroblock buffer) 34.

The average quantization scale computation unit 32 computes an average quantization scale of a frame from quantization scales of macroblocks included in the frame. As described above, the quantization scales are stored in the quantization scale buffer 33.

The complexity buffer 36 is used for storing the complexity of a frame. The complexity of a frame is calculated from the average quantization scale of the frame computed by the average quantization scale computation unit 32 and the quantity of code allocated to the frame in accordance with Eq. (29). As described earlier, the code quantity for the frame is stored in the code quantity buffer (frame buffer) 31.

The initial reference quantization scale computation unit 37 computes an optimum value to be used as an initial value of a reference quantization scale for a frame from the average quantization scale of the frame, the quantity of code allocated to the frame and a target code quantity for the frame as will be described later. As described above, the average quantization scale of the frame is computed by the average quantization scale computation unit 32, and the quantity of code allocated to the frame is stored in the code quantity buffer (frame buffer) 31. The target code quantity for the frame is computed by the target code quantity computation unit 42.

The activity buffer 39 computes and stores an activity of each macroblock in a frame from the quantization scale of the macroblock stored in the quantization scale buffer 33 and the quantity of code allocated to the macroblock. As described earlier, the quantity of code allocated to the macroblock is stored in the code quantity buffer (macroblock buffer) 34.

The average activity computation unit 38 computes an average activity of a frame from the activities of macroblocks included in the frames. As described earlier, the activities of macroblocks included in the frames are stored in the activity buffer 39.

Information on the picture type of each frame in a GOP is transferred from the picture type buffer 35 to the ring buffer 40 employed in the code quantity control unit 19. The GOP structure determination unit 41 determines the structure of the GOP in output MPEG2 picture compressed information from information on the picture types of the GOP frames, which is stored in the ring buffer 40.

The target code quantity computation unit 42 computes a target code quantity of each frame of the output MPEG2 picture compressed information in accordance with Eqs. (26) to (28) or Eqs. (34) to (36) from the GOP structure of the output MPEG2 picture compressed information and the complexity of the frame in the input MPEG2 picture compressed information. As described earlier, the GOP structure of the output MPEG2 picture compressed information is determined by the GOP structure determination unit 41, and the complexity of the frame in the input MPEG2 picture compressed information is stored in the complexity buffer 36. The occupation sizes of the virtual buffer 43 are updated on the basis of the computed target code quantities. Details of the operation to update the virtual buffer 43 will be described later.

The adaptive quantization unit 44 computes a quantization scale of a macroblock by using a reference quantization scale $Q_j$ of the macroblock and a normalized activity N_act computed in accordance with Eq. (37), (38) or (39). The reference quantization scale $Q_j$ of the macroblock is computed by the virtual buffer 43. In the computation of the normalized activity N-act, the average activity for the frame and activities of macroblocks in the frame are used. The average activity for the frame is held by the average activity computation unit 38, and activities of macroblocks in the frame are stored in the activity buffer 39 respectively.

Feedback information obtained from the processing of the output MPEG2 picture compressed information is supplied to the target code quantity computation unit 42 and the virtual buffer 43.

The following method explains a method of keeping the reference quantization scale at all but uniform values throughout the screen. Let notation $Q_{i0}$ denote an average quantization scale for the first I picture included in the input MPEG2 picture compressed information. The average quantization scale $Q_{i0}$ is held in the average quantization scale computation unit 32. Let notation $B_{i0}$ denote the quantity of code allocated to the first I picture included in the input MPEG2 picture compressed information. The code quantity $B_{i0}$ is stored in the code quantity buffer (frame buffer) 31. Let notation $T_{i0}$ denote a target code quantity computed by the target code quantity computation unit 52 in accordance with Eq. (26) or (34). In this case, an initial value $refQ_{i0}$ of the reference quantization scale is expressed by Eq. (40) as follows:

$$refQ_{i0} = \frac{Q_{i0} \cdot B_{i0}}{T_{i0}} \quad (40)$$

Thus, an initial occupation size $d_0^i$ of the virtual buffer 43 for the I picture can be computed in accordance with Eq. (41) given below:

$$d_0^i = \frac{refQ_{i0} \times r}{31} \quad (41)$$

In the calculation of the initial occupation sizes $d_0^p$ and $d_0^b$ of the virtual buffer 43 for the P and B pictures respectively, instead of using Eq. (32), the values of $K_p$ and $K_b$ can be computed in accordance with Eq. (42) as follows:

$$d_0^p = K_p \cdot d_0^i; d_0^b = K_b \cdot d_0^i \quad (42)$$

where the values of $K_p$ and $K_b$ are determined by Eq. (32).

As the initial value refQi0 of the reference quantization scale for the I picture is found by using Eq. (40), initial values $refQ_{p0}$ and $refQ_{b0}$ of the reference quantization scale for the P and B pictures can be computed in accordance with Eqs. (43) and (44) respectively. By the same token, as the initial occupation size $d_0^i$ of the virtual buffer 43 for the I picture can be computed in accordance with Eq. (41), initial occupation sizes $d_0^p$ and $d_0^b$ of the virtual buffer 43 for the P and B pictures can be computed in accordance with Eqs. (45) and (46) respectively as follows:

$$refQ_{p0} = \frac{Q_{p0} \cdot B_{p0}}{T_{p0}} \quad (43)$$

$$refQ_{b0} = \frac{Q_{b0} \cdot B_{b0}}{T_{b0}} \quad (44)$$

$$d_0^p = \frac{refQ_{p0} \times r}{31} \quad (45)$$

$$d_0^b = \frac{refQ_{b0} \times r}{31} \quad (46)$$

Let notation $Q_k$ denote a quantization scale for a macroblock k in the input MPEG2 picture compressed information where k=0 to MB_cnt. As described earlier, the quantization scale $Q_k$ is stored in the quantization scale buffer 33. Let notation $B_k$ denote the quantity of code allocated to the macroblock k. As described earlier, the code quantity $B_k$ is stored in the code quantity buffer (macroblock buffer) 34. Let notation $X_k$ denote an activity of the macroblock k. As described earlier, the activity $X_k$ is stored in the activity buffer 39. In this case, the quantization scale $Q_k$, the code quantity $B_k$ and the activity $X_k$ satisfy a relation expressed by Eq. (47) as follows.

$$X_k = Q_k \cdot B_k \quad (47)$$

By the way, a sum $X_{total}$ of activities of macroblocks throughout the entire frame is expressed by Eq. (48) as follows:

$$X_{total} = \sum_{k=0}^{MB\_cnt} X_k \quad (48)$$

By using the definition expressed by Eq. (48), the occupation sizes of the virtual buffer 43 can be updated in accordance with Eqs. (49) to (51) given below:

$$d_j^i = d_o^i + B_{j-1} - \frac{\sum_{k=0}^{j-1} X_{i,k}}{X_{i,total}} \times T_i \quad (49)$$

$$d_j^p = d_o^p + B_{j-1} - \frac{\sum_{k=0}^{j-1} X_{p,k}}{X_{p,total}} \times T_p \quad (50)$$

$$d_j^b = d_o^b + B_{j-1} - \frac{\sum_{k=0}^{j-1} X_{b,k}}{X_{b,total}} \times T_b \quad (51)$$

where notations $X_{i,k}$, $X_{p,k}$ and $X_{b,k}$ each denote the activity $X_k$ of a macroblock k in I, P and B pictures respectively whereas notations $X_{i,total}$, $X_{p,total}$ and $X_{b,total}$ each denote the activity sum $X_{total}$ for all macroblocks in I, P and B pictures respectively.

By using Eqs. (49) to (51) given above, the reference quantization scales before the quantization process can be held at uniform values throughout the frame. Thus, the adaptive quantization process carried out by the adaptive quantization unit 44 for each macroblock can be made more effective. As a result, the amount of block distortion can be reduced.

It should be noted that the scope of the invention is not limited to the embodiments described above. It is needless to say that a variety of changes and modifications can be made to the embodiments within a range not departing from essentials of the present invention. For example, while picture compressed information conforming to the MPEG2 system is used as an input object of processing in the embodiments of the present invention, any picture compressed information conforming to other system can also be used to reduce the quantity of code in the same configuration as the apparatus provided by the present invention as long as the picture compressed information has been encoded by orthogonal transformation and motion compensation as is the case with a system such as MPEG1, MPEG4 or H.263. In addition, in the picture information transformation apparatus, information can also be transferred from the decoding unit to the encoding unit through a pixel domain.

While a preferred embodiment of the present invention has been described using specific terms, such description is for illustrative purposes only, and it is to be understood that changes and variations may be made without departing from the spirit or scope of the following claims.

[FIG. 1]

INPUT

PICTURE COMPRESSED INFORMATION (HIGH BIT RATE)
11: CODE BUFFER
12: COMPRESSED INFORMATION ANALYSIS UNIT
13: INFORMATION BUFFER
14: VARIABLE LENGTH DECODING UNIT
15: INVERSE QUANTIZATION UNIT
17: BAND LIMITING UNIT
18: QUANTIZATION UNIT
19: CODE QUANTITY CONTROL UNIT
20: CODE BUFFER
21: VARIABLE LENGTH ENCODING UNIT
23: INVERSE QUANTIZATION UNIT
25: INVERSE DISCRETE COSINE TRANSFORMATION UNIT
26: VIDEO MEMORY
27: MOTION COMPENSATION PREDICTION UNIT
28: DISCRETE COSINE TRANSFORMATION UNIT

OUTPUT

PICTURE COMPRESSED INFORMATION (LOW BIT RATE)

[FIG. 9]

FEED FORWARD BUFFER (FOR 6 FRAMES)

RING BUFFER (256 ELEMENTS)

INPUT

PICTURE COMPRESSED INFORMATION

PSEUDO GOP LENGTH

PSEUDO GOP

[FIG. 10]

INPUT

MPEG2 PICTURE COMPRESSED INFORMATION (BIT STREAM)

13: INFORMATION BUFFER
31: CODE QUANTITY BUFFER (FRAME)
32: AVERAGE QUANTIZATION SCALE COMPUTATION UNIT
33: QUANTIZATION SCALE BUFFER
34: CODE QUANTITY BUFFER (MACROBLOCK)
35: PICTURE TYPE BUFFER
36: COMPLEXITY BUFFER
37: INITIAL REFERENCE QUANTIZATION SCALE COMPUTATION UNIT
38: AVERAGE ACTIVITY COMPUTATION UNIT
39: ACTIVITY BUFFER
19: CODE QUANTITY CONTROL UNIT
40: RING BUFFER
41: GOP STRUCTURE DETERMINATION UNIT
42: TARGET CODE QUANTITY COMPUTATION UNIT
43: VIRTUAL BUFFER
44: ADAPTIVE QUANTIZATION UNIT

OUTPUT

QUANTIZATION SCALE FOR MACROBLOCK CONCERN

FEEDBACK INFORMATION FROM CODING UNIT

[FIG. 11]

INPUT

PICTURE COMPRESSED INFORMATION (HIGH BIT RATE)
101: CODE BUFFER
102: COMPRESSED INFORMATION ANALYSIS UNIT
103: INFORMATION BUFFER
104: VARIABLE LENGTH DECODING UNIT
105: INVERSE QUANTIZATION UNIT
107: BAND LIMITING UNIT
108: QUANTIZATION UNIT
109: CODE QUANTITY CONTROL UNIT
110: CODE BUFFER
111: VARIABLE LENGTH ENCODING UNIT

OUTPUT

PICTURE COMPRESSED INFORMATION (LOW BIT RATE)
112: MOTION COMPENSATION ERROR CORRECTION UNIT

[FIG. 12]

INPUT

MPEG2 PICTURE COMPRESSED INFORMATION (BIT STREAM)
103: INFORMATION BUFFER
201: CODE QUANTITY BUFFER (FRAME)
202: AVERAGE QUANTIZATION SCALE COMPUTATION UNIT
203: QUANTIZATION SCALE BUFFER
204: CODE QUANTITY BUFFER (MACROBLOCK)
205: PICTURE TYPE BUFFER
206: COMPLEXITY BUFFER
207: AVERAGE ACTIVITY COMPUTATION UNIT
208: ACTIVITY BUFFER
109: CODE QUANTITY CONTROL UNIT
209: RING BUFFER
210: GOP STRUCTURE DETERMINATION UNIT
211: TARGET CODE QUANTITY COMPUTATION UNIT
212: VIRTUAL BUFFER
213: ADAPTIVE QUANTIZATION UNIT

OUTPUT

QUANTIZATION SCALE FOR MACROBLOCK CONCERN

FEEDBACK INFORMATION FROM CODING UNIT

[FIG. 13]

S100: DETERMINE PSEUDO GOP STRUCTURE BY PRE-PARSING

S101: COMPUTE TARGET CODE QUANTITY (TARGET BIT) FOR EACH FRAME

S102: EXECUTE CODE QUANTITY CONTROL USING VIRTUAL BUFFER

S103: PERFORM ADAPTIVE QUANTIZATION BASED ON ACTIVITIES COMPUTED IN DCT DOMAIN

OUTPUT $Q_1$

OUTPUT $Q_2$

What is claimed is:

1. A processing apparatus for controlling a code quantity comprising:

a decoding unit that decodes information in accordance with a predetermined format, and outputs decoded compressed information and extracts information for carrying out encoding processing from said compressed information, wherein the compressed information is encoded using an external encoding process based on discrete cosine transformation and motion compensation, and includes at least an intraframe encoded picture, an interframe forward directional prediction encoded picture and a bi-directional prediction encoded picture;

an encoding unit for encoding decoded information from said decoding unit;

a code quantity control unit for controlling code quantity of said encoded information based on said extracted information;

a virtual buffer for storing and updating occupation sizes of said intraframe, interframe forward directional prediction and bi-directional prediction encoded pictures determined based on information extracted from said compressed information;

wherein said occupation sizes $d_j^i$, $-d_j^p$ and $d_j^b$ of said virtual buffer for said intraframe, interframe forward directional prediction and bi-directional prediction encoded pictures in said compressed information respectively are updated in accordance with the following equations:

$$d_j^i = d_o^i + B_{j-1} - \frac{\sum_{k=0}^{j-1} X_{i,k}}{X_{i,total}} \times T_i$$

$$d_j^p = d_o^p + B_{j-1} - \frac{\sum_{k=0}^{j-1} X_{p,k}}{X_{p,total}} \times T_p$$

$$d_j^b = d_o^b + B_{j-1} - \frac{\sum_{k=0}^{j-1} X_{b,k}}{X_{b,total}} \times T_b$$

where:

notations $d_o^i$, $-d_o^p$ and $d_o^b$ denote initial occupation sizes of said virtual buffer for said intraframe, interframe forward directional prediction and bi-directional prediction encoded pictures respectively;

notations and $X_{i,k}$, $X_{p,k}$ and $X_{b,k}$ denote activities for macroblocks included in said intraframe, interframe forward directional prediction and bi-directional prediction encoded pictures respectively;

notations $X_{i,total}$, $X_{p,total}$ and $X_{b,total}$ denote total activities for all macroblocks included in one frame of said compressed information for said intraframe, interframe forward directional prediction and bi-directional prediction encoded pictures respectively;

notations $T_i$, $T_p$ and $T_b$ denote target code quantities per frame for said intraframe, interframe forward directional prediction and bi-directional prediction encoded pictures respectively; and notation $B_j$ denotes a quantity of code generated in the jth macroblock in a frame seen with a first macroblock in said frame regarded as a 0th macroblock.

2. A processing apparatus according to claim 1, wherein said extracted information includes a quantization scale, a code quantity and a picture type.

3. A method according to claim 1, wherein notations $X_{i,k}$, $X_{p,k}$ and $X_{b,k}$ are defined by the following equations:

$$X_{i,k}=Q_{i,k} \cdot B_{i,k}$$

$$X_{p,k}=Q_{p,k} \cdot B_{p,k}$$

$$X_{b,k}=Q_{b,k} \cdot B_{b,k}$$

notations $X_{i,total}$, $X_{p,total}$ and $X_{b,total}$ are defined by the following equations:

$$X_{i,total} = \sum_{k=0}^{MB\_cnt} X_{i,k}$$

$$X_{p,total} = \sum_{k=0}^{MB\_cnt} X_{p,k}$$

$$X_{b,total} = \sum_{k=0}^{MB\_cnt} X_{b,k}$$

where notations $Q_{i,k}$, $Q_{p,k}$ and $Q_{b,k}$ denote quantization scales for said macroblocks included in said intraframe, interframe forward directional prediction and bi-directional prediction encoded pictures respectively;

notations $B_{i,k}$, $B_{p,k}$ and $B_{b,k}$ denote quantities of code allocated to said macroblocks included in said intraframe, interframe forward directional prediction and bi-directional prediction encoded pictures respectively; and notation MB—cnt denotes the number of macroblocks included in one frame.

4. A method for controlling a code quantity comprising the steps of:

outputting compressed information, from a decoding unit, that is decoded in accordance with a predetermined format and has completed an encoding process based on discrete cosine transformation and motion compensation, wherein said compressed information includes at least an intraframe encoded picture, an interframe forward directional prediction encoded picture and a bi-directional prediction encoded picture;

extracting information for carrying out encoding processing from said compressed information;

encodings by an encoding unit, said information from said decoding unit; and controlling, by a code quantity control unit, code quantity of said encoded information based on said extracted information produced in said extracting step;

wherein said code quantity controlling step includes an operation to update occupation sizes of a virtual buffer for said intraframe, interframe forward directional prediction and bi-directional prediction encoded pictures based on information extracted from said compressed information; and said code quantity controlling step includes, said occupation sizes $d_j^i$, $d_j^p$ and $d_j^b$ of said virtual buffer for said intraframe, interframe forward directional prediction and bi-directional prediction encoded pictures in said compressed information respectively are updated in accordance with the following equations:

$$d_j^i = d_o^i + B_{j-1} - \frac{\sum_{k=0}^{j-1} X_{i,k}}{X_{i,total}} \times T_i$$

$$d_j^p = d_o^p + B_{j-1} - \frac{\sum_{k=0}^{j-1} X_{p,k}}{X_{p,total}} \times T_p$$

$$d_j^b = d_o^b + B_{j-1} - \frac{\sum_{k=0}^{j-1} X_{b,k}}{X_{b,total}} \times T_b$$

where:

notations $d_o^i$, $d_o^p$ and $d_o^b$ denote initial occupation sizes of said virtual buffer for said intraframe, interframe forward directional prediction and bi-directional prediction encoded pictures respectively;

notations $X_{i,k}$, $X_{p,k}$ and $X_{b,k}$ denote activities for macroblocks included in said intraframe interframe forward directional prediction and bi-directional prediction encoded pictures respectively;

notations $X_{i,total}$, $X_{p,total}$ and $X_{b,total}$ denote total activities for all macroblocks included in one frame of said compressed information for said intraframe, interframe forward directional prediction and bi-directional prediction encoded pictures respectively;

notations $T_i$, $T_p$ and $T_b$ denote target code quantities per frame for said intraframe, interframe forward directional prediction and bi-directional prediction encoded pictures respectively; and notation $B_j$ denotes a quantity of code generated in the jth macroblock in a frame seen with a first macroblock in said frame regarded as a 0th macroblock.

5. A method according to claim 4 wherein said extracted information in said extracting step includes a quantization scale, a code quantity and a picture type.

6. A method according to claim 4, wherein notations $X_{i,k}$, $X_{p,k}$ and $X_{b,k}$ are defined by the following equations:

$$X_{i,k} = Q_{i,k} \cdot B_{i,k}$$

$$X_{p,k} = Q_{p,k} \cdot B_{p,k}$$

$$X_{b,k} = Q_{b,k} \cdot B_{b,k}$$

notations $X_{i,total}$, $X_{p,total}$ and $X_{b,total}$ are defined by the following equations:

$$X_{i,total} = \sum_{k=0}^{MB\_cnt} X_{i,k}$$

$$X_{p,total} = \sum_{k=0}^{MB\_cnt} X_{p,k}$$

$$X_{b,total} = \sum_{k=0}^{MB\_cnt} X_{b,k}$$

where notations $Q_{i,k}$ $Q_{p,k}$ and $Q_{b,k}$ denote quantization scales for said macroblocks included in said intraframe, interframe forward directional prediction and bi-directional prediction encoded pictures respectively;

notations $B_{i,k}$ $B_{p,k}$ and $B_{b,k}$ denote quantities of code allocated to said macroblocks included in said intraframe, interframe forward directional prediction and bi-directional prediction encoded pictures respectively; and notation MB—cnt denotes the number of macroblocks included in one frame.

* * * * *